US00RE45398E

(19) United States
(12) Reissued Patent
Wallace

(10) Patent Number: US RE45,398 E
(45) Date of Reissued Patent: Mar. 3, 2015

(54) SYSTEM FOR TRACKING AND ANALYZING WELDING ACTIVITY

(71) Applicant: Lincoln Global, Inc., City of Industry, CA (US)

(72) Inventor: Matthew Wayne Wallace, South Windsor, CT (US)

(73) Assignee: Lincoln Global, Inc., City of Industry, CA (US)

(21) Appl. No.: 14/177,692

(22) Filed: Feb. 11, 2014

Related U.S. Patent Documents

Reissue of:
(64) Patent No.: 8,274,013
Issued: Sep. 25, 2012
Appl. No.: 12/719,053
Filed: Mar. 8, 2010

U.S. Applications:
(60) Provisional application No. 61/158,578, filed on Mar. 9, 2009.

(51) Int. Cl.
*B23K 9/06* (2006.01)

(52) U.S. Cl.
USPC ..... 219/137 R; 219/124.34; 219/130.33; 219/136; 219/130.01

(58) Field of Classification Search
CPC ..... B23K 9/0953
USPC ..... 257/137 R
See application file for complete search history.

(56) References Cited

U.S. PATENT DOCUMENTS

| | | | |
|---|---|---|---|
| 1,159,119 | A | 11/1915 | Springer |
| D140,630 | S | 3/1945 | Garibay |
| D142,377 | S | 9/1945 | Dunn |
| D152,049 | S | 12/1948 | Welch |
| 2,681,969 | A | 6/1954 | Burke |
| D174,208 | S | 3/1955 | Abidgaard |
| 2,728,838 | A | 12/1955 | Barnes |
| D176,942 | S | 2/1956 | Cross |
| 2,894,086 | A | 7/1959 | Rizer |

(Continued)

FOREIGN PATENT DOCUMENTS

| | | |
|---|---|---|
| CN | 201083660 | 7/2008 |
| CN | 101419755 | 4/2009 |

(Continued)

OTHER PUBLICATIONS

International Search Report and Written Opinion from PCT/IB09/000605 dated Feb. 12, 2010.

(Continued)

*Primary Examiner* — David Vu
*Assistant Examiner* — Jonathan Han
(74) *Attorney, Agent, or Firm* — Perkins Coie LLP

(57) ABSTRACT

A system and a method for tracking and analyzing welding activity. Dynamic spatial properties of a welding tool are sensed during a welding process producing a weld. The sensed dynamic spatial properties are tracked over time and the tracked dynamic spatial properties are captured as tracked data during the welding process. The tracked data is analyzed to determine performance characteristics of a welder performing the welding process and quality characteristics of a weld produced by the welding process. The performance characteristics and the quality characteristics may be subsequently reviewed.

195 Claims, 6 Drawing Sheets

AMENDED

(56) References Cited

U.S. PATENT DOCUMENTS 3,035,155 A 5/1962 Hawk
3,356,823 A 12/1967 Waters
3,555,239 A 1/1971 Kerth
3,621,177 A 11/1971 Freeman McPherson et al.
3,654,421 A 4/1972 Streetman et al.
3,739,140 A 6/1973 Rotilio
3,866,011 A 2/1975 Cole et al.
3,867,769 A 2/1975 Schow et al.
3,904,845 A 9/1975 Minkiewicz et al.
D243,459 S 2/1977 Bliss
4,024,371 A 5/1977 Drake
4,041,615 A 8/1977 Whitehill
D247,421 S 3/1978 Driscoll
4,124,944 A 11/1978 Blair
4,132,014 A 1/1979 Schow
4,237,365 A 12/1980 Lambros et al.
4,280,041 A 7/1981 Kiessling et al.
4,280,137 A 7/1981 Ashida et al.
4,314,125 A 2/1982 Nakamura
4,410,787 A 10/1983 Kremers
4,429,266 A 1/1984 Traadt
4,452,589 A 6/1984 Denison
D275,292 S 8/1984 Bouman
D277,761 S 2/1985 Korovin et al.
D280,329 S 8/1985 Bouman
4,611,111 A 9/1986 Baheti et al.
4,616,326 A 10/1986 Meier et al.
4,677,277 A 6/1987 Cook et al.
4,680,014 A 7/1987 Paton et al.
4,689,021 A 8/1987 Vasiliev et al.
4,707,582 A 11/1987 Beyer
4,716,273 A 12/1987 Paton et al.
D297,704 S 9/1988 Bulow
4,867,685 A 9/1989 Brush et al.
4,877,940 A 10/1989 Bangs et al.
4,897,521 A 1/1990 Burr
4,907,973 A 3/1990 Hon
4,931,018 A 6/1990 Herbst et al.
5,192,845 A 3/1993 Kirmsse et al.
5,206,472 A 4/1993 Myking et al.
5,320,538 A 6/1994 Baum
5,337,611 A 8/1994 Fleming et al.
5,360,156 A 11/1994 Ishizaka et al.
5,360,960 A 11/1994 Shirk
5,370,071 A 12/1994 Ackermann
D359,296 S 6/1995 Witherspoon
5,424,634 A 6/1995 Goldfarb et al.
5,464,957 A 11/1995 Kidwell et al.
D365,583 S 12/1995 Viken
5,670,071 A 9/1997 Ueyama et al.
5,676,503 A 10/1997 Lang
5,676,867 A 10/1997 Allen
5,708,253 A 1/1998 Bloch et al.
D392,534 S 3/1998 Degen
D396,238 S 7/1998 Schmitt
5,823,785 A 10/1998 Matherne, Jr.
5,845,053 A 12/1998 Watanabe
6,008,470 A 12/1999 Zhang
6,049,059 A 4/2000 Kim
6,051,805 A 4/2000 Vaidya et al.
6,155,475 A 12/2000 Ekelof et al.
6,155,928 A 12/2000 Burdick
6,236,017 B1 5/2001 Smartt et al.
6,242,711 B1 6/2001 Cooper
6,271,500 B1 8/2001 Hirayam et al.
6,330,938 B1 12/2001 Herve et al.
6,330,966 B1 12/2001 Eissfeller
D456,428 S 4/2002 Aronson et al.
D456,828 S 5/2002 Aronson et al.
D461,383 S 8/2002 Blackburn
6,441,342 B1 8/2002 Hsu
6,445,964 B1 9/2002 White et al.
6,506,997 B2 1/2003 Matsuyama
6,552,303 B1 4/2003 Blankenship et al.
6,568,846 B1 5/2003 Cote et al.
D475,726 S 6/2003 Suga et al.
6,583,386 B1 * 6/2003 Ivkovich ..... 219/130.01
6,621,049 B2 9/2003 Suzuki
6,624,388 B1 9/2003 Blankenship et al.
D482,171 S 11/2003 Vui et al.
6,647,288 B2 11/2003 Madill et al.
6,649,858 B2 11/2003 Wakeman
6,655,645 B1 12/2003 Lu et al.
6,660,965 B2 12/2003 Simpson
6,697,701 B2 2/2004 Hillen et al.
6,697,770 B1 2/2004 Nagetgall
6,703,585 B2 3/2004 Suzuki
6,710,299 B2 3/2004 Blankenship et al.
6,715,502 B1 4/2004 Rome et al.
D490,347 S 5/2004 Meyers
6,744,011 B1 6/2004 Hu et al.
6,750,428 B2 6/2004 Okamoto et al.
6,772,802 B2 8/2004 Few
6,795,778 B2 9/2004 Dodge et al.
6,798,974 B1 9/2004 Nakano et al.
6,857,553 B1 2/2005 Hartman et al.
6,858,817 B2 2/2005 Blankenship et al.
D504,449 S 4/2005 Butchko
6,920,371 B2 7/2005 Hillen et al.
6,940,037 B1 * 9/2005 Kovacevic et al. ..... 219/121.64
6,940,039 B2 9/2005 Blankenship et al.
7,021,937 B2 4/2006 Simpson et al.
7,132,617 B2 11/2006 Lee et al.
7,170,032 B2 1/2007 Flood
7,194,447 B2 3/2007 Harvey et al.
7,247,814 B2 7/2007 Ott
D555,446 S 11/2007 Ibarrondo et al.
D561,973 S 2/2008 Kinsley et al.
7,353,715 B2 4/2008 Myers
7,363,137 B2 4/2008 Brant et al.
7,375,304 B2 5/2008 Kainec et al.
7,414,595 B1 8/2008 Muffler
7,465,230 B2 12/2008 LeMay et al.
D587,975 S 3/2009 Aronson et al.
7,516,022 B2 4/2009 Lee et al.
D602,057 S 10/2009 Osicki
D606,102 S 12/2009 Bender et al.
7,643,890 B1 1/2010 Hillen et al.
7,687,741 B2 3/2010 Kainec et al.
D614,217 S 4/2010 Peters et al.
D615,573 S 5/2010 Peters et al.
D631,074 S 1/2011 Peters et al.
7,874,921 B2 1/2011 Baszucki et al.
7,991,587 B2 8/2011 Ihn
8,069,017 B2 11/2011 Hallquist
8,265,886 B2 9/2012 Bisiauz et al.
8,274,013 B2 9/2012 Wallace
8,363,048 B2 1/2013 Gering
8,365,603 B2 2/2013 Lesage et al.
2001/0045808 A1 11/2001 Hietmann et al.
2002/0032553 A1 3/2002 Simpson et al.
2002/0046999 A1 4/2002 Veikkolainen
2002/0085843 A1 7/2002 Mann
2003/0000931 A1 1/2003 Ueda
2003/0111451 A1 6/2003 Blankenship et al.
2003/0172032 A1 9/2003 Choquet
2004/0035990 A1 2/2004 Ackeret
2004/0050824 A1 3/2004 Samler
2004/0140301 A1 7/2004 Blankenship et al.
2004/0217096 A1 * 11/2004 Lipnevicius ..... 219/125.11
2005/0101767 A1 5/2005 Clapham et al.
2005/0103766 A1 5/2005 Iizuka et al.
2005/0103767 A1 5/2005 Kainec et al.
2005/0109735 A1 5/2005 Flood
2005/0133488 A1 6/2005 Blankenship et al.
2005/0189336 A1 9/2005 Ku
2005/0199602 A1 9/2005 Kaddani et al.
2005/0230573 A1 10/2005 Ligertwood
2005/0252897 A1 11/2005 Hsu
2005/0275913 A1 12/2005 Vesely et al.
2005/0275914 A1 12/2005 Vesely et al.
2006/0014130 A1 1/2006 Weinstein
2006/0136183 A1 6/2006 Choquet
2006/0163227 A1 7/2006 Hillen et al.

(56) References Cited

U.S. PATENT DOCUMENTS

| | | | | |
|---|---|---|---|---|
| 2006/0169682 | A1 | 8/2006 | Kainec et al. | |
| 2006/0173619 | A1 | 8/2006 | Brant et al. | |
| 2006/0207980 | A1 | 9/2006 | Jacovetty et al. | |
| 2006/0213892 | A1 | 9/2006 | Ott | |
| 2006/0258447 | A1 | 11/2006 | Baszucki et al. | |
| 2007/0034611 | A1 | 2/2007 | Drius et al. | |
| 2007/0038400 | A1 | 2/2007 | Lee et al. | |
| 2007/0045488 | A1 | 3/2007 | Shin | |
| 2007/0088536 | A1 | 4/2007 | Ishikawa | |
| 2007/0198117 | A1 | 8/2007 | Wajihuddin | |
| 2007/0211026 | A1 | 9/2007 | Ohta | |
| 2007/0221797 | A1 | 9/2007 | Thompson et al. | |
| 2007/0256503 | A1 | 11/2007 | Wong et al. | |
| 2007/0277611 | A1 | 12/2007 | Portzgen et al. | |
| 2007/0291035 | A1 | 12/2007 | Vesely et al. | |
| 2008/0038702 | A1 | 2/2008 | Choquet | |
| 2008/0061113 | A9* | 3/2008 | Seki et al. | 228/103 |
| 2008/0078811 | A1 | 4/2008 | Hillen et al. | |
| 2008/0078812 | A1 | 4/2008 | Peters et al. | |
| 2008/0117203 | A1 | 5/2008 | Gering | |
| 2008/0128398 | A1 | 6/2008 | Schneider | |
| 2008/0135533 | A1 | 6/2008 | Ertmer et al. | |
| 2008/0140815 | A1 | 6/2008 | Brant et al. | |
| 2008/0149686 | A1 | 6/2008 | Daniel et al. | |
| 2008/0203075 | A1 | 8/2008 | Feldhausen et al. | |
| 2008/0233550 | A1 | 9/2008 | Solomon | |
| 2008/0314887 | A1 | 12/2008 | Stoger | |
| 2009/0015585 | A1 | 1/2009 | Klusza | |
| 2009/0057286 | A1 | 3/2009 | Ihara | |
| 2009/0152251 | A1 | 6/2009 | Dantinne et al. | |
| 2009/0173726 | A1 | 7/2009 | Davidson et al. | |
| 2009/0184098 | A1 | 7/2009 | Daniel et al. | |
| 2009/0200281 | A1 | 8/2009 | Hampton | |
| 2009/0200282 | A1 | 8/2009 | Hampton | |
| 2009/0231423 | A1 | 9/2009 | Becker | |
| 2009/0298024 | A1 | 12/2009 | Batzler et al. | |
| 2010/0012637 | A1 | 1/2010 | Jaeger | |
| 2010/0048273 | A1 | 2/2010 | Wallace et al. | |
| 2010/0062405 | A1 | 3/2010 | Zboray et al. | |
| 2010/0062406 | A1 | 3/2010 | Zboray et al. | |
| 2010/0096373 | A1 | 4/2010 | Hillen et al. | |
| 2010/0133247 | A1* | 6/2010 | Mazumder et al. | 219/121.83 |
| 2010/0176107 | A1 | 7/2010 | Bong | |
| 2010/0201803 | A1 | 8/2010 | Melikian | |
| 2010/0224610 | A1 | 9/2010 | Wallace | |
| 2010/0276396 | A1 | 11/2010 | Cooper et al. | |
| 2010/0307249 | A1 | 12/2010 | Lesage et al. | |
| 2011/0006047 | A1 | 1/2011 | Penrod et al. | |
| 2011/0060568 | A1 | 3/2011 | Goldfine et al. | |
| 2011/0091846 | A1 | 4/2011 | Kreindl et al. | |
| 2011/0114615 | A1 | 5/2011 | Daniel et al. | |
| 2011/0117527 | A1 | 5/2011 | Conrardy et al. | |
| 2011/0183304 | A1 | 7/2011 | Wallace et al. | |
| 2012/0189993 | A1 | 7/2012 | Kindig et al. | |

FOREIGN PATENT DOCUMENTS

| | | | |
|---|---|---|---|
| CN | 101419755 | A1 | 4/2009 |
| CN | 201229711 | | 4/2009 |
| CN | 101571887 | | 11/2009 |
| CN | 101587659 | | 11/2009 |
| CN | 101587659 | A | 11/2009 |
| DE | 2833638 | | 2/1980 |
| DE | 3046634 | | 1/1984 |
| DE | 3244307 | | 5/1984 |
| DE | 3522581 | | 1/1987 |
| DE | 19615069 | | 10/1997 |
| DE | 19739720 | | 10/1998 |
| DE | 20009543 | | 8/2001 |
| DE | 102005047204 | | 4/2007 |
| DE | 102010038902 | | 9/2012 |
| EP | 108599 | | 5/1984 |
| EP | 127299 | | 12/1984 |
| EP | 145891 | | 6/1985 |
| EP | 319623 | | 6/1989 |
| EP | 1527852 | | 5/2005 |
| EP | 1905533 | | 4/2008 |
| ES | 2274736 | A1 | 5/2007 |
| ES | 2274736 | | 3/2008 |
| FR | 2827066 | | 1/2003 |
| FR | 2926660 | | 7/2009 |
| GB | 1455972 | | 11/1976 |
| GB | 1511608 | | 5/1978 |
| GB | 2254172 | | 9/1992 |
| GB | 2454232 | | 6/2009 |
| JP | 2224877 | | 9/1990 |
| JP | 5329645 | | 12/1993 |
| JP | 7047471 | | 2/1995 |
| JP | 7232270 | | 9/1995 |
| JP | 8132274 | | 5/1996 |
| JP | 8150476 | | 6/1996 |
| JP | 8505091 | | 6/1996 |
| JP | 2000167666 | | 6/2000 |
| JP | 2001071140 | | 3/2001 |
| JP | 2003200372 | | 7/2003 |
| JP | 2003326362 | | 11/2003 |
| JP | 2006281270 | | 10/2006 |
| JP | 2007290025 | | 11/2007 |
| JP | 2009500178 | | 1/2009 |
| JP | 2009160636 | | 7/2009 |
| KR | 20090010693 | | 1/2009 |
| KR | 20090010693 | A | 1/2009 |
| RU | 2008108601 | | 11/2009 |
| SU | 1038963 | | 8/1983 |
| WO | WO9845078 | | 10/1998 |
| WO | WO0143910 | | 6/2001 |
| WO | 2006034571 | A1 | 4/2006 |
| WO | WO2006034571 | | 4/2006 |
| WO | WO2007039278 | | 4/2007 |
| WO | WO2009060231 | | 5/2009 |
| WO | WO2009149740 | | 12/2009 |
| WO | WO2010000003 | | 1/2010 |
| WO | WO2010091493 | | 8/2010 |
| WO | WO2011067447 | | 6/2011 |
| WO | WO2012143327 | | 10/2012 |
| WO | WO2013014202 | | 1/2013 |

OTHER PUBLICATIONS

International Search Report and Written Opinion from PCT/IB10/02913 dated Apr. 19, 2011.

ASME Definitions, Consumables, Welding Positions, dated Mar. 19, 2001. See http://www.gowelding.com/wp/asme4.htm.

Abbas, M., et al.; Code_Aster; Introduction to Code_Aster; User Manual; Booket U1.0-: Introduction to Code_Aster; Document: U1.02.00; Version 7.4; Jul. 22, 2005.

Bjorn G. Agren; Sensor Integration for Robotic Arc Welding; 1995; vol. 5604C of Dissertations Abstracts International p. 1123; Dissertation Abs Online (Dialog® File 35): © 2012 ProQuest Info& Learning: http://dialogweb.com/cgi/dwclient?req=1331233317524; one (1) page; printed Mar. 8, 2012.

Abid, et al., "Numerical simulation to study the effect of tack welds and root gap on welding deformations and residual stresses of a pipe-flange joint" by M. Abid and M. Siddique, Faculty of Mechanical Engineering, GIK Institute of Engineering Sciences and Technology, Topi, NWFP, Pakistan. Available on-line Aug. 25, 2005.

"Penetration in Spot GTA Welds during Centrifugation, "D.K. Aidun and S.A. Martin; Journal of Materials Engineering and Performance vol. 7(5) Oct. 1998—597.

Arc+ simulator; http://www.123arc.com/en/depliant_ang.pdf; 2000, 2 pgs.

ARS Electronica Linz GmbH, Fronius, 2 pages, May 18, 1997.

Asciencetutor.com, A division of Advanced Science and Automation Corp., VWL (Virtual Welding Lab), 2 pages, 2007.

16TH International Shop and Offshore Structures Congress: Aug. 20-25, 2006: Southhampton, UK, vol. 2 Specialist Committee V.3 Fabrication Technology Committee Mandate: T Borzecki, G. Bruce, Y.S. Han, M. Heinemann, A Imakita, L. Josefson, W. Nie, D. Olson, F. Roland, and Y. Takeda.

(56) References Cited

OTHER PUBLICATIONS

CS Wave, A Virtual learning tool for welding motion, 10 pages, Mar. 14, 2008.
Choquet, Claude; "ARC+: Today's Virtual Reality Solution for Welders" Internet Page, Jan. 1, 2008.
Code Aster (Software) EDF (France), Oct. 2001.
Cooperative Research Program, Virtual Reality Welder Training, Summary Report SR 0512, 4 pages, Jul. 2005.
Desroches, X.; Code-Aster, Note of use for aclculations of welding; Instruction manual U2.03 booklet: Thermomechanical; Document: U2.03.05; Oct. 1, 2003.
Edison Welding Institute, E-Weld Predictor, 3 pages, 2008.
Eduwelding+, Weld Into the Fugure; Online Welding Seminar—A virtual training environment; 123arc.com; 4 pages, 2005.
Eduwelding+, Training Activities with arc+ simulator; Weld Into The Future, Online Welding Simulator—A virtual training environment; 123arc.com; 6 pages, May 2008.
FH Joanneum, Fronius—virtual welding, 2 pages, May 12, 2008.
The Fabricator, Virtual Welding, 4 pages, Mar. 2008.
Fast, K. et al., "Virtual Training for Welding", Mixed and Augmented Realtity, 2004, ISMAR 2004, Third IEEE and CM International Symposium on Arlington, VA, Nov. 2-5, 2004.
Garcia-Ellende et al., "Defect Detection in Arc-Welding Processes by Means of the Line-to-Continuum Method and Feature Selection", www.mdpi.com/journal/sensors; Sensors 2009, 9, 7753-7770; doi; 10.3390/s91007753.
Juan Vicenete Rosell Gonzales, "RV-Sold: simulator virtual para la formacion de soldadores"; Deformacion Metalica, Es. vol. 34, No. 301 Jan. 1, 2008.
Hillis and Steele, Jr.; "Data Parallel Algorithms", Communications of the ACM, Dec. 1986, vol. 29, No. 12, p. 1170.
"The influence of fluid flow phenomena on the laser beam welding process"; International Journal of Heat and Fluid Flow 23, dated 2002.
The Lincoln Electric Company, CheckPoint Production Monitoring brochure; four pages; http://www.lincolnelectric.com/assets/en_US/products/literature/s232.pdf; Publication S2.32; issue date Feb. 2012.
The Lincoln Electric Company, Production Monitoring brochure, 4 pages, May 2009.
Eric Linholm, John Nickolls, Stuart Oberman, and John Montrym, "NVIDIA Testla: A Unifired Graphics and Computing Architecture", IEEE Computer Society, 2008.
Mahrle, A., et al.; "the influence of fluid flow phenomena on the laser beam welding process" International Journal of Heat and Fluid Flow 23 (2002, No. 3, pp. 288-.
Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, Apr. 1, 2006, pp. 294-300.
Mechanisms and Mechanical Devices Source Book, Chironis, Neil Sclater; McGraw Hill; 2nd Addition, 1996.
Miller Electric Mgf Co.; MIG Welding System features weld monitoring software; NewsRoom 2010 (Dialog® File 992); © 2011 Dialog. 2010; http://www.dialogweb.com/cgi/dwclient?reg=1331233430487; three (3) pages; printed Mar. 8, 2012.
NSRP ASE, Low-Cost Virtual Reality Welder Training System, 1 Page, 2008.
N. A. Tech., P/NA.3 Process Modeling and Optimization, 11 pages, Jun. 4, 2008.
Virtual Reality Welder Trainer, Sessiion 5: Joining Technologies for Naval Applications: earliest date Jul. 14, 2006 (http://weayback.archive.org) by Nancy C. Porter, Edision Welding Institute; J. Allan Cote, General Dynamics Electric Boat; Timothy D. Gifford, VRSim, and Wim Lam, FCS Controls.
Porter, et al., Virtual Reality Training, Paper No. 2005-P19, 14 pages, 2005.
Production Monitoring 2 brochure, four pages, The Lincoln Electric Company, May 2009.
Ratnam and Khalid: "Automatic classification of weld defects using simulated data and an MLP neutral network." Insight vol. 49, No. 3; Mar. 2007.
Russel and Norvig, "Artificial Intelligence: A Modern Approach", Prentice-Hall (Copyright 1995).
"Design and Implementation of a Video Sensor for Closed Loop Control of Back Bead Weld Puddle Width," Robert Schoder, Massachusetts Institute of Technology, Dept. of Mechanical Engineering, May 27, 1983.
Sim Welder, retrieved on Apr. 12, 2010 from: http://www.simwelder.com.
SIMFOR / CESOL, "RV-SOLD" Welding Simulator, Technical and Functional Features, 20 pages, no date available.
Training in a virtual environment gives welding students a leg up, retrieved on Apr. 12, 2010 from: http://www.thefabricator.com/article/arcwelding/virtually-welding.
Wade, "Human uses of ultrasound: ancient and modern", Ultrasonics vol. 38, dated 2000.
Wang et al., "Numerical Analysis of Metal Tranfser in Gas Metal Arc Welding," G. Wang, P.G. Huang, and Y.M. Zhang. Departements of Mechanical and Electrical Engineering. University of Kentucky, Dec. 10, 2001.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
White et al., Virtual welder training, 2009 IEEE Virtual Reality Conference, p. 303, 2009.
*Edison Welding Institue, Inc. and Realweld Systems, Inc.* -v- *Lincoln Global, Inc.*; Complaint for Declaratory Judgement including Exhibits; Civil Action No. 2:12-cv-1040, 2012.
*Edison Welding Institue, Inc. and Realweld Systems, Inc.* -v- *Lincoln Global, Inc.*; Stipulated Extension of Time to Answer . . . Civil Action No. 2:12-cv-1040, 2013.
*Edison Welding Institue, Inc. and Realweld Systems, Inc.* -v- *Lincoln Global, Inc.*; Corporate Disclosure Statement; Civil Action No. 2:12-cv-1040, 2013.
*Edison Welding Institue, Inc. and Realweld Systems, Inc.* -v- *Lincoln Global, Inc.*; Notice of Appearance of Counsel; Civil Action No. 2:12-cv-1040, 2013.
*Edison Welding Institue, Inc. and Realweld Systems, Inc.* -v- *Lincoln Global,Inc.*; Unopposed Motion to Dismiss w/o Prejudice including Exhibits; Civil Action No. 2:12-cv-1040, 2013.
*Edison Welding Institue, Inc. and Realweld Systems, Inc.* -v- *Lincoln Global, Inc.*; Order Granting Motion; Civil Action No. 2:12-cv-1040, 2013.
Edison Welding Institute, Inc.; Docket; Civil Action No. 2:12-cv-1040, 2012.
Yizhong Wang, Younghua Chen, Zhongliang Nan, Yong Hu, Study on Welder Training by Means of Haptic Guidance and Virtual Reality for Arc Welding, 2006 IEEE International Conference on Robotics and Biomimetics, pp. 954-958, ROBIO 2006 ISBN-10:1424405718, Dec. 17-20, 2006, Kunming, China.
Nancy C. Porter, J. Allan Cote, Timothy D. Gifford, Wim Lan, Virtual Reality Welder Training, Paper No. 2005-P19, 2005, pp. 1-14.
Asciencetutor.Com, A Division of Advanced Science and Automation Corp., VWL (Virtual Welding Lab), 2007, 2 pages.
Edison Welding Institute, E-Weld Predictor, 3 pages, 2008, Columbus, OH.
Tim Heston, Virtually welding, The Fabricator, Mar. 2008, 4 pages, FMA Communications Inc., Rockford, IL, www.thefabricator.com.
NSRP ASE, Low-Cost Virtual Reality Welder Training System, 2008, 1 page.
Steven White, Mores Prachyabrued, Dhruva Baghi, Amit Aglawe, Dirk Reiners, Christoph Borst, Terry Chambers, Virtual Welder Trainer, IEEE Virtual Reality 2009, p. 303.
Nancy Porter, J. Allan Cote, Timothy Gifford, Virtual Reality Welder Training, CRP Cooperative Research Program, Summary Report SR 0512, Jul. 2005, 4 pages.
Weld Into the Future, Eduwelding+, Training Activities with arc+ simulator, 2005, 4 pages.

(56) References Cited

OTHER PUBLICATIONS

Claude Choquet, ARC+: Today's Virtual Reality Solution for Welders, 123 Certification Inc.,Montreal, Quebec, CA, May 2008, 6 pages.
Laurent Da Dalto, Dominique Steib, Daniel Mellet-d'Huart, Olivier Balet, CS WAVE A Virtual learning tool for the welding motion, http://wave,c-s.fr, Mar. 14, 2008, 10 pages.
CS WAVE, The Virtual Welding Trainer, 6 pages, 2007.
Fronius—virtual welding, www.fh-joanneum.at/ca/cn/yly/?lan=en, 2 pages, May 12, 2008.
Fronius, ARS Electronica, 2 pages, May 18, 1997.
P/NA.3 Process Modelling and Optimization, www.natech-inc.com/pna3/index.html, 11 pages, Jun. 4, 2008.
"RV-Sold" Welding Simulator Technical and Functional Features, SIMFOR, pp. 1-20, date unknown.
Juan Vicente Rosell, RV-Sold: Simulador virtual para la formacion de soldadores, Deformacion Metalica, Es. vol. 34, No. 301, 14 pages, Jan. 1, 2008.
Kenneth Fast, Timothy Gifford, Robert Yancy, Virtual Training for Welding, 3rd IEEE and ACM International symposium on Mixed and Augmented Reality (ISMAR 2004), 2 pages, 2004.
D. Mavrikios, V. Karabatsou, D. Fragos, G. Chryssolouris, A prototype virtual reality-0cased demonstrator for immersive and interactive simulation of welding processes, International Journal of Computer Integrated Manufacturing, 294-301, 2006.
PCT/IB2009/00605 International Search Report.
PCT/IB2009/00605 Written Opinion.
U.S. Appl. No. 29/399,980, filed Jul. 10, 2009, issued May 11, 2010 as D615,573.
U.S. Appl. No. 29/339,979, filed Jul. 10, 2009, issued Apr. 20, 2010 as D614,217.
U.S. Appl. No. 29/339,978, filed Jul. 10, 2009.
U.S. Appl. No. 12/504,870, filed Jul. 17, 2009 claiming priority to U.S. Appl. No. 61/090,794.
U.S. Appl. No. 12/501,263, filed Jul. 10, 2009 claiming priority to U.S. Appl. No. 61/090,794.
U.S. Appl. No. 12/501,257, filed Jul. 10, 2009 claiming priority to U.S. Appl. No. 61/090,764.

* cited by examiner

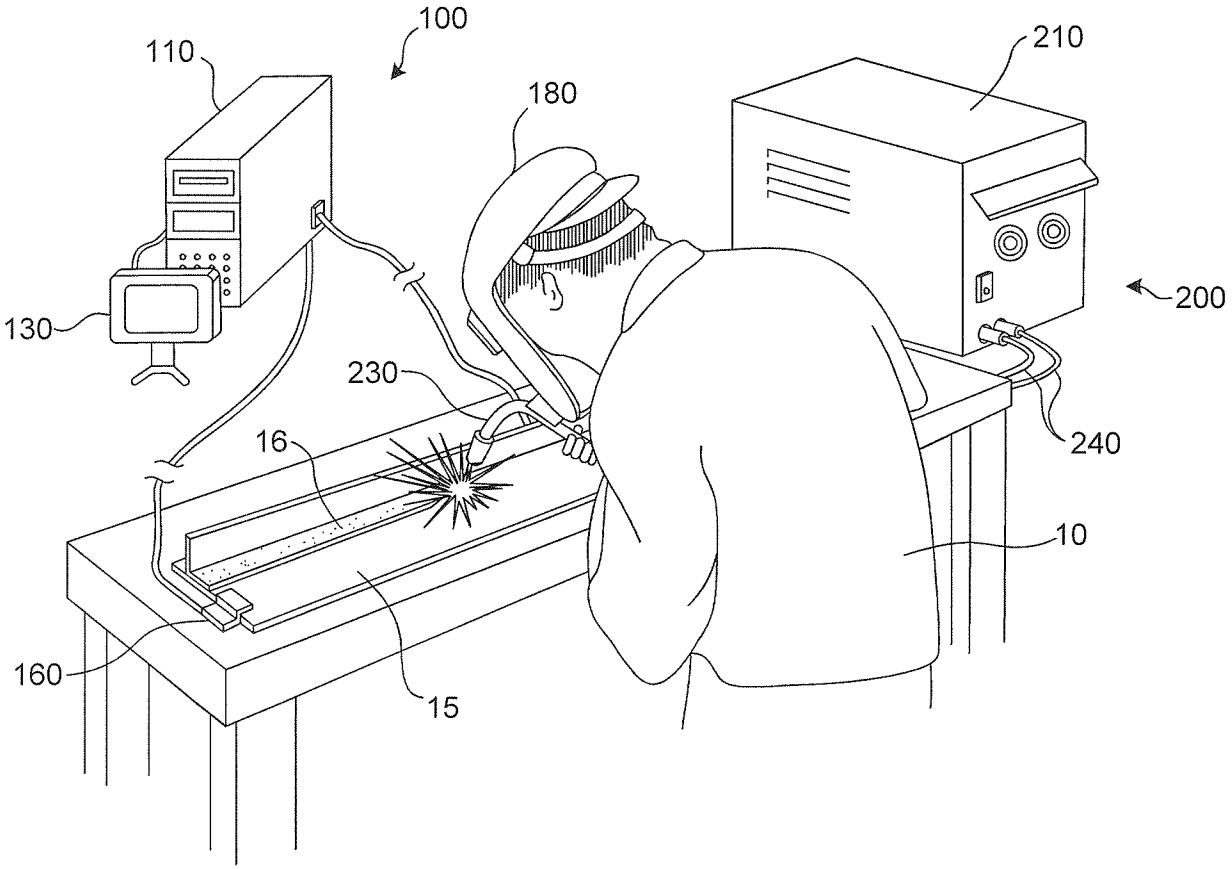
*FIG. 1*
AMENDED

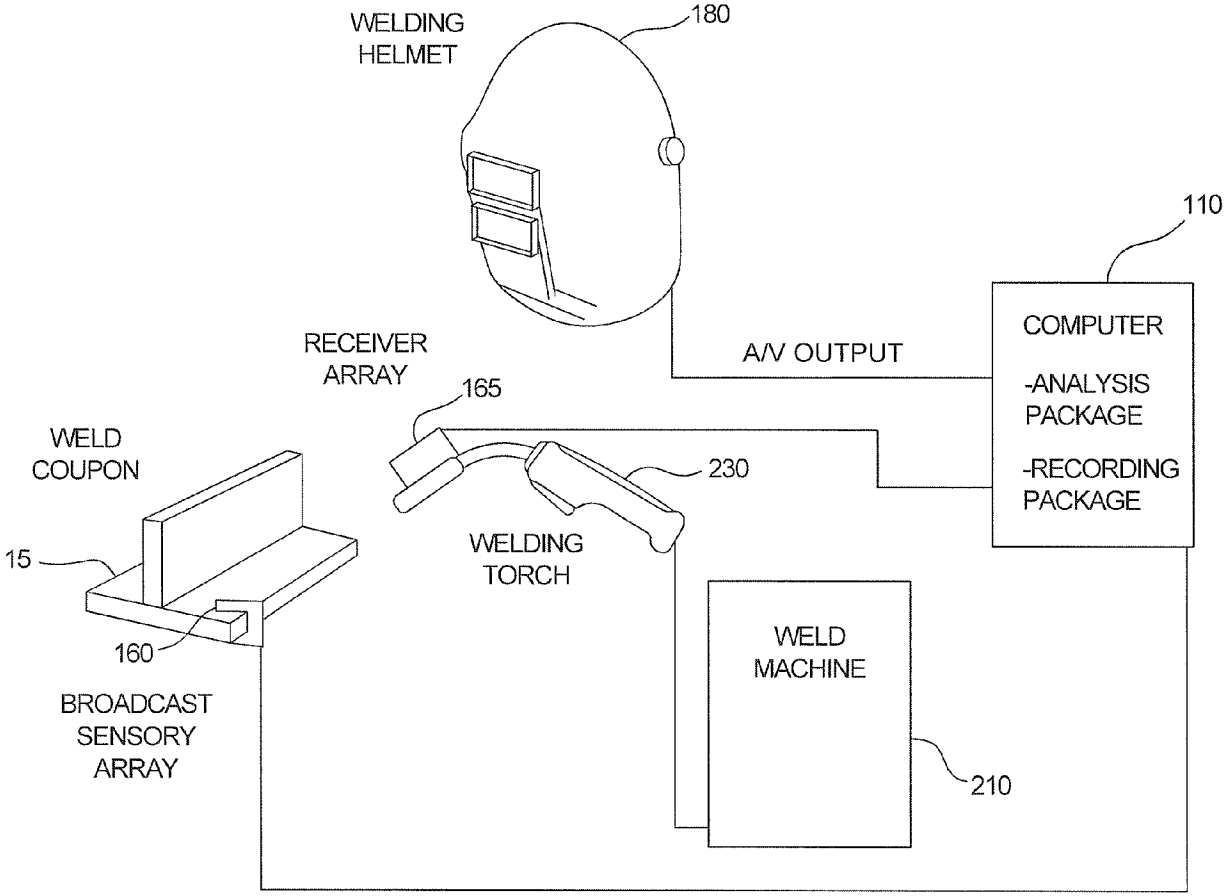
*FIG. 2*
AMENDED

SYSTEM FOR TRACKING AND ANALYZING WELDING ACTIVITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This U.S. patent application claims priority to and the benefit of U.S. provisional patent application Ser. No. 61/158,578 which was filed on Mar. 9, 2009, and which is incorporated herein by reference in its entirety.

TECHNICAL FIELD

Certain embodiments of the present invention pertain to systems for tracking and analyzing welding activity, and more particularly, to systems that capture weld data in real time (or near real time) for analysis and review. Additionally, the embodiments of the present invention provide a system for marking portions of a welded article by indicating possible discontinuities or flaws within the weld joint.

BACKGROUND

In many applications, ascertaining the quality of weld joints is critical to the use and operation of a machine or structure incorporating a welded article. In some instances, x-raying or other nondestructive testing is needed to identify potential flaws within one or more welded joints. However, non-destructive testing can be cumbersome to use, and typically lags the welding process until the inspector arrives to complete the testing. Additionally, it may not be effective for use with all weld joint configurations. Moreover, non-destructive testing does not provide any information about how the weld was completed. In welding applications where identifying waste is vital to producing cost effective parts, non-destructive testing provides no insight into problems like overfill.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

The embodiments of the present invention pertain to a system for tracking and analyzing welding activity. The system may be used in conjunction with a welding power supply and includes a sensor array and logic processor-based technology that captures performance data (dynamic spatial properties) as the welder performs various welding activities. The system functions to evaluate the data via an analysis engine for determining weld quality in real time (or near real time). The system also functions to store and replay data for review at a time subsequent to the welding activity thereby allowing other users of the system to review the performance activity of the welding process.

These and other novel features of the subject matter of the present application, as well as details of illustrated embodiments thereof, will be more fully understood from the following description and drawings.

BRIEF DESCRIPTION OF THE DRAWINGS

FIG. 1 is a perspective view of a welder using an embodiment of a system for tracking and analyzing welding activity;

FIG. 2 is a schematic representation of an embodiment of the system of FIG. 1 for tracking and analyzing welding activity;

DETAILED DESCRIPTION

Figure 3:
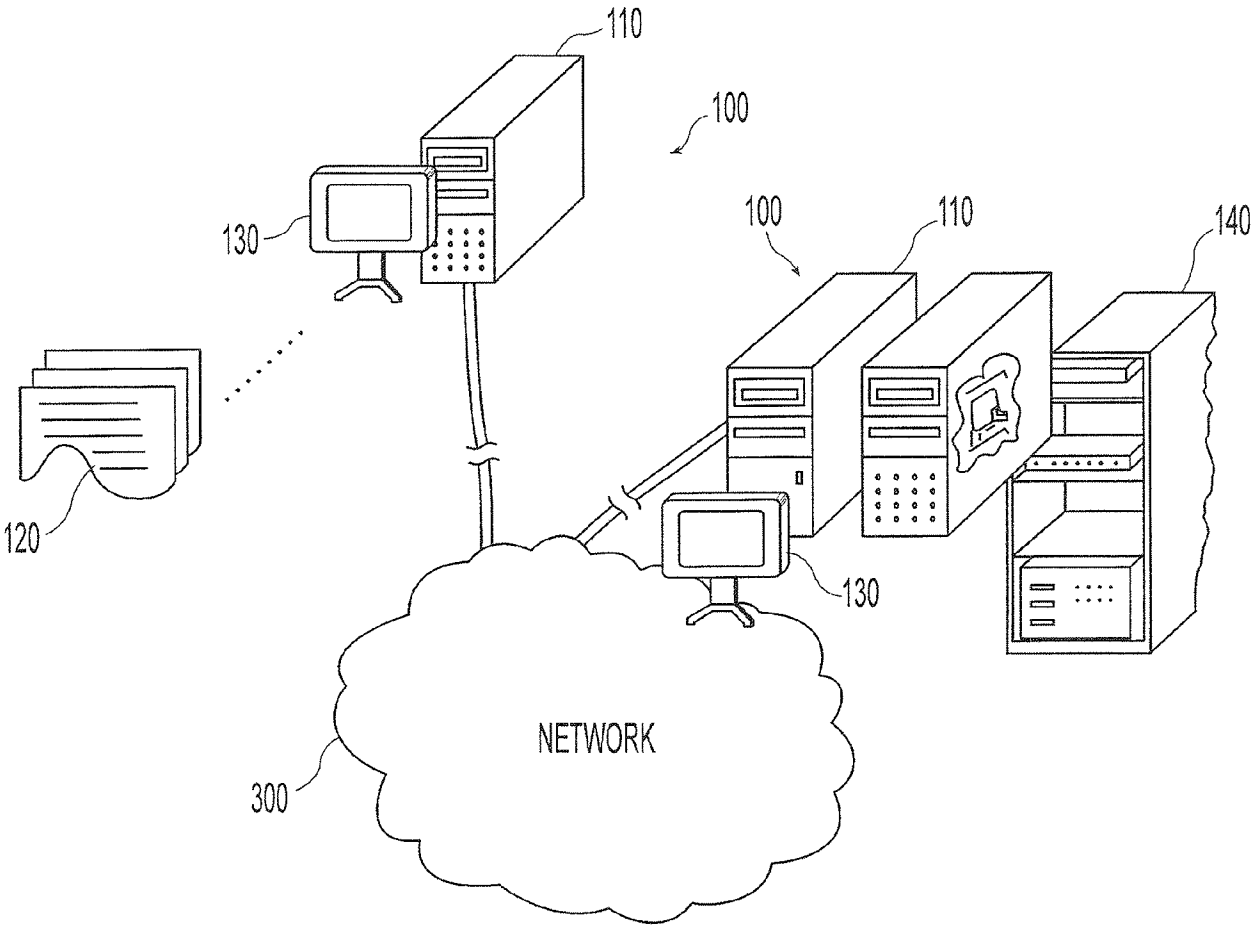
FIG. 3 is a schematic representation of an embodiment of the hardware and software of the system of FIGS. 1-2 for tracking and analyzing welding activity.
Figure 4:
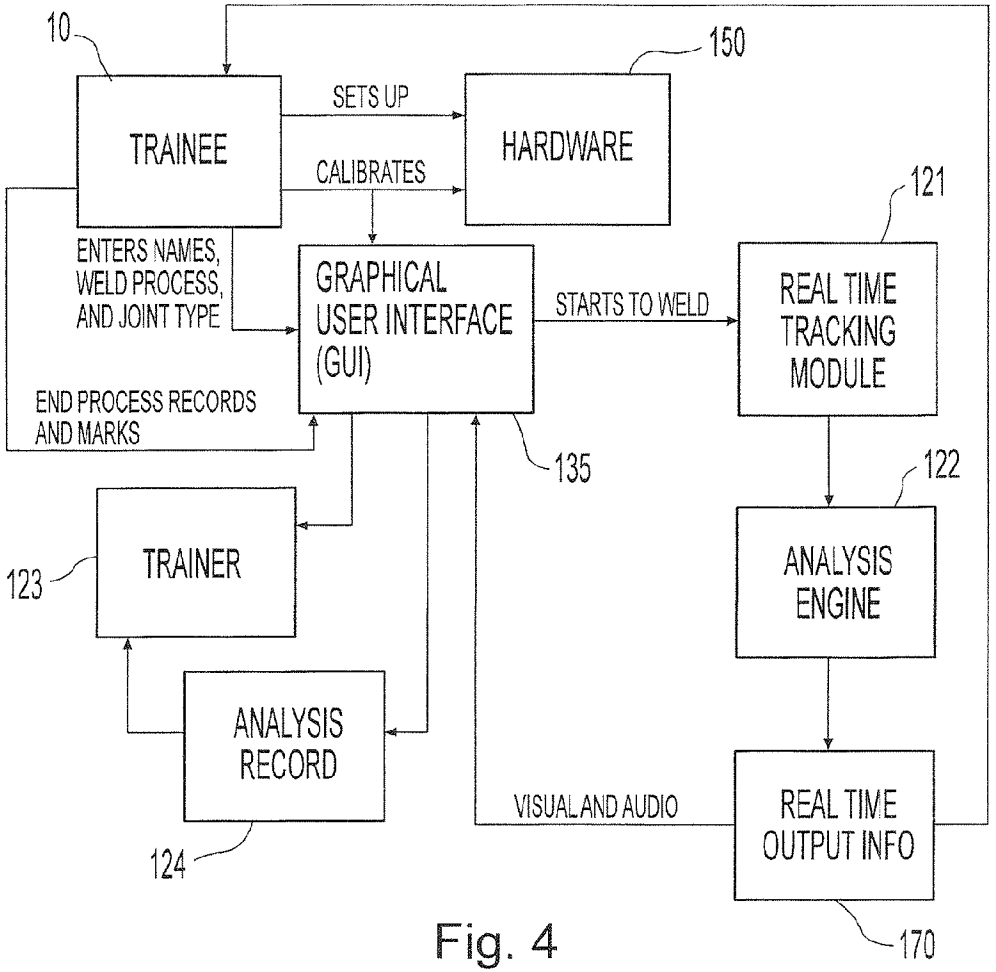
FIG. 4 is a flow diagram of an embodiment of the system of FIGS. 1-3 for tracking and analyzing welding activity.
Figure 5:
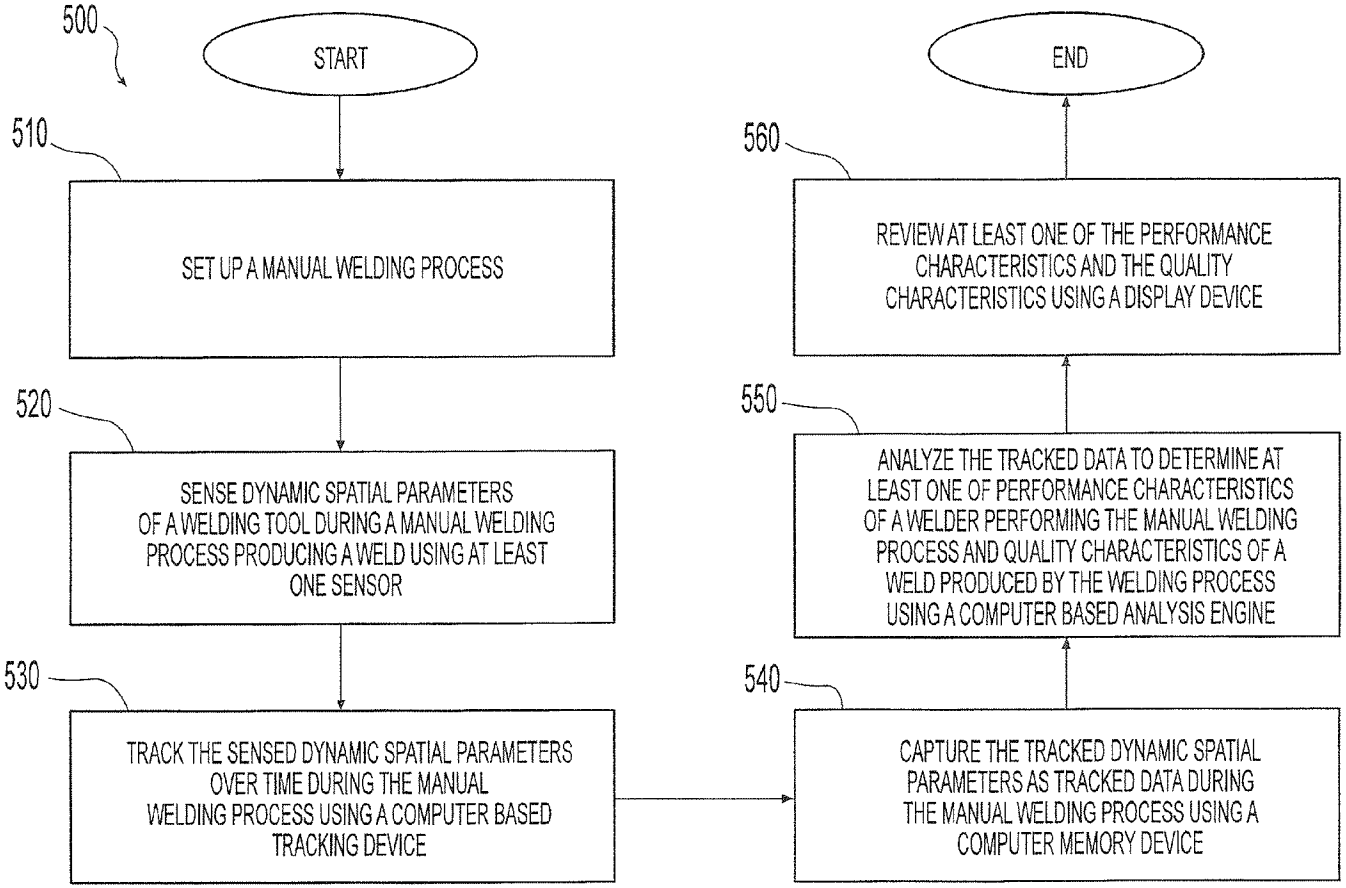
FIG. 5 is a flowchart of an embodiment of a method for tracking and analyzing welding activity using the system of FIGS. 1-4.

FIG. 1 is a perspective view of a welder 10 using an embodiment of a system 100 for tracking and analyzing welding activity while performing a welding process with a welding system 200. FIG. 2 is a schematic representation of an embodiment of the system 100 of FIG. 1 for tracking and analyzing welding activity. FIG. 3 is a schematic representation of an embodiment of the hardware 110, 130 and software 120 of the system 100 of FIGS. 1-2 for tracking and analyzing welding activity. FIG. 4 is a flow diagram of an embodiment of the system 100 of FIGS. 1-3 for tracking and analyzing welding activity. FIG. 5 is a flowchart of an embodiment of a method 500 for tracking and analyzing welding activity using the system 100 of FIGS. 1-4.

Referring again to the drawings wherein the showings are for purposes of illustrating embodiments of the invention only and not for purposes of limiting the same, FIG. 1 shows a system 100 for tracking and analyzing manual processes requiring the dexterity of a human end user 10. In particular, system 100 functions to capture performance data related to the use and handling of tools (e.g., welding tools). In one embodiment, the system 100 is used to track and analyze welding activity, which may be a manual welding process in any of its forms including but not limited to: arc welding, laser welding, brazing, soldering, oxyacetylene and gas welding, and the like. For illustrative purposes, the embodiments of the present invention will be described in the context of arc welding. However, persons of ordinary skill in the art will understand its application to other manual processes. In accordance with alternative embodiments of the present invention, the manual welder 10 may be replaced with a robotic welder. As such, the performance of the robotic welder and resultant weld quality may be determined in a similar manner.

In one embodiment, the system 100 tracks movement or motion (i.e., position and orientation over time) of a welding tool 230, which may be, for example, an electrode holder or a welding torch. Accordingly, the system 100 is used in conjunction with a welding system 200 including a welding power supply 210, a welding torch 230, and welding cables 240, along with other welding equipment and accessories. As a welder 10, i.e. end user 10, performs welding activity in accordance with a welding process, the system 100 functions to capture performance data from real world welding activity as sensed by sensors 160, 165 (see FIG. 2) which are discussed in more detail later herein.

In accordance with an embodiment of the present invention, the system 100 for tracking and analyzing welding activity includes the capability to automatically sense dynamic spatial properties (e.g., positions, orientations, and movements) of a welding tool 230 during a manual welding process producing a weld 16 (e.g., a weld joint). The system 100 further includes the capability to automatically track the sensed dynamic spatial properties of the welding tool 230 over time and automatically capture (e.g., electronically capture) the tracked dynamic spatial properties of the welding tool 230 during the manual welding process.

The system 100 also includes the capability to automatically analyze the tracked data to determine performance characteristics of a welder 10 performing the manual welding process and quality characteristics of a weld 16 produced by the welding process. The system 100 allows for the performance characteristics of the welder 10 and the quality characteristics of the weld to be reviewed. The performance characteristics of a welder 10 may include, for example, a weld joint trajectory, a travel speed of the welding tool 230, welding tool pitch and roll angles, an electrode distance to a center weld joint, an electrode trajectory, and a weld time. The quality characteristics of a weld produced by the welding process may include, for example, discontinuities and flaws within certain regions of a weld produced by the welding process.

The system 100 further allows a user (e.g., a welder 10) to locally interact with the system 100. In accordance with another embodiment of the present invention, the system 100 allows a remotely located user to remotely interact with the system 100. In either scenario, the system 100 may automatically authorize access to a user of the system 100, assuming such authorization is warranted.

In accordance with an embodiment of the present invention, the system 100 for tracking and analyzing welding activity includes a processor based computing device 110 configured to track and analyze dynamic spatial properties (e.g., positions, orientations, and movements) of a welding tool 230 over time during a manual welding process producing a weld 16. The system 100 further includes at least one sensor array 160, 165 operatively interfacing to the processor based computing device 110 (wired or wirelessly) and configured to sense the dynamic spatial properties of a welding tool 230 during a manual welding process producing a weld 16. The system 100 also includes at least one user interface operatively interfacing to the processor based computing device 110. The user interface may include a graphical user interface 135 and/or a display device (e.g., a display 130 or a welding display helmet 180 where a display is integrated into a welding helmet as illustrated in FIG. 2). The system 100 may further include a network interface configured to interface the processor based computing device 110 to a communication network 300 (e.g., the internet).

In accordance with an embodiment of the present invention, a method 500 (see FIG. 5) for tracking and analyzing welding activity includes, in step 510, setting up a manual welding process, and, in step 520, sensing dynamic spatial properties (e.g., positions, orientations, and movements) of a welding tool 230 during a manual welding process producing a weld using at least one sensor (e.g., sensor arrays 160 and 165). In step 530, the method includes tracking the sensed dynamic spatial properties over time during the manual welding process using a real time tracking module 121 (see FIG. 4). The method also includes, in step 540, capturing the tracked dynamic spatial properties as tracked data during the manual welding process using a computer based (e.g., electronic) memory device (e.g., a portion of the hardware 150 and software 120 of the processor based computing device 110). The method further includes, in step 550, analyzing the tracked data to determine performance characteristics of a welder 10 performing the manual welding process and/or quality characteristics of a weld produced by the welding process using a computer based analysis engine 122. In step 560, at least one of the performance characteristics and the quality characteristics are reviewed using a display device (e.g., display device 130). Alternatively, a visualization module or a testing module may be used in place of the display device 130, as are well known in the art.

The method 500 may initially include selecting welding set up parameters for the welding process via a user interface 135 as part of step 510. The method may also include outputting the performance characteristics of the welder 10 and/or the quality characteristics of a weld to a remote location and remotely viewing the performance characteristics and/or the quality characteristics via a communication network 300 (see FIG. 3).

The system 100 for tracking and analyzing welding activity comprises hardware and software components, in accordance with an embodiment of the present invention. In one embodiment, the system 100 incorporates electronic hardware. More specifically, system 100 may be constructed, at least in part, from electronic hardware 150 (see FIG. 4) of the processor based computing device 110 operable to execute programmed algorithms, also referred to herein as software 120 or a computer program product. The processor based computing device 110 may employ one or more logic processors capable of being programmed, an example of which may include one or more microprocessors. However, other types of programmable circuitry may be used without departing from the intended scope of coverage of the embodiments of the present invention. In one embodiment, the processor based computing device 110 is operatively disposed as a microcomputer in any of various configurations including but not limited to: a laptop computer, a desktop computer, a work station, a server or the like. Alternatively, mini-computers or main frame computers may serve as the platform for implementing the system 100 for tracking and analyzing welding activity. Moreover, handheld or mobile processor based computing devices may be used to execute programmable code for tracking and analyzing performance data.

Other embodiments are contemplated wherein the system 100 is incorporated into the welding system 200. More specifically, the components comprising the system 100 may be integrated into the welding power supply 210 and/or weld torch 230. For example, the processor based computing device 110 may be received internal to the housing of the welding power supply 210 and may share a common power supply with other systems located therein. Additionally, sensors 160, 165, used to sense the weld torch 230 dynamic spatial properties, may be integrated into the weld torch handle.

The system 100 may communicate with and be used in conjunction with other similarly or dissimilarly constructed systems. Input to and output from the system 100, termed I/O, may be facilitated by networking hardware and software including wireless as well as hard wired (directly connected) network interface devices. Communication to and from the system 100 may be accomplished remotely as through a network 300 (see FIG. 3), such as, for example, a wide area network (WAN) or the Internet, or through a local area network (LAN) via network hubs, repeaters, or by any means chosen with sound engineering judgment. In this manner, information may be transmitted between systems as is useful for analyzing, and/or re-constructing and displaying performance and quality data.

In one embodiment, remote communications are used to provide virtual instruction by personnel, i.e. remote or offsite users, not located at the welding site. Reconstruction of the welding process is accomplished via networking. Data representing a particular weld may be sent to another similar or dissimilar system 100 capable of displaying the weld data (see FIG. 3). It should be noted that the transmitted data is sufficiently detailed for allowing remote user(s) to analyze the welder's performance and the resultant weld quality. Data sent to a remote system 100 may be used to generate a virtual welding environment thereby recreating the welding process as viewed by offsite users as discussed later herein. Still, any way of communicating performance data to another entity remotely located from the welding site may be used without departing from the intended scope of coverage of the embodiments of the subject invention.

The processor based computing device 110 further includes support circuitry including electronic memory devices, along with other peripheral support circuitry that facilitate operation of the one or more logic processor(s), in accordance with an embodiment of the present invention. Additionally, the processor based computing device 110 may include data storage, examples of which include hard disk drives, optical storage devices and/or flash memory for the storage and retrieval of data. Still any type of support circuitry may be used with the one or more logic processors as chosen with sound engineering judgment. Accordingly, the processor based computing device 110 may be programmable and operable to execute coded instructions in a high or low level programming language. It should be noted that any form of programming or type of programming language may be used to code algorithms as executed by the system 100.

With reference now to FIGS. 1-4, the system 100 is accessible by the end user 10 via a display screen 130 operatively connected to the processor based computing device 110. Software 120 installed onto the system 100 directs the end user's 10 interaction with the system 100 by displaying instructions and/or menu options on, for example, the display screen 130 via one or more graphical user interfaces (GUI) 135. Interaction with the system 100 includes functions relating to, for example: part set up (weld joint set up), welding activity analysis, weld activity playback, real time tracking, as well as administrative activity for managing the captured data. Still other functions may be chosen as are appropriate for use with the embodiments of the present invention. System navigation screens, i.e. menu screens, may be included to assist the end user 10 in traversing through the system functions. It is noted that as the system 100 is used for training and analysis, security may be incorporated into the GUI(s) 135 that allow restricted access to various groups of end users 10. Password security, biometrics, work card arrangement or other security measures may be used to ensure that system access is given only to authorized users as determined by an administrator or administrative user. It will be appreciated that the end user 10 may be the same or a different person than that of the administrative user.

In one embodiment, the system 100 functions to capture performance data of the end user 10 for manual activity as related to the use of tools or hand held devices. In the accompanying figures, welding, and more specifically, arc welding is illustrated as performed by the end user 10 on a weldment 15 (e.g., a weld coupon). The welding activity is recorded by the system 100 in real time or near-real time for tracking and analysis purposes mentioned above by a real time tracking module 121 and an analysis module 122, respectively (see FIG. 4). By recorded it is meant that the system 10 captures data related to a particular welding process for determining the quality of the weld joint or weld joints. The types of performance data that may be captured include, but are not limited to, for example: weld joint configuration or weld joint trajectory, weld speed, welding torch pitch and roll angles, electrode distance to the center weld joint, wire feed speed, electrode trajectory, weld time, and time and date data. Other types of data may also be captured and/or entered into the system 100 including: weldment materials, electrode materials, user name, project ID number, and the like. Still, any type and quantity of information may be captured and/or entered into the system 100 as is suitable for tracking, analyzing and managing weld performance data. In this manner, detailed information about how the welding process for a particular weld joint was performed may be captured and reconstructed for review and analysis in an analysis record 124.

The data captured and entered into the system 100 is used to determine the quality of the real world weld joint. Persons of ordinary skill in the art will understand that a weld joint may be analyzed by various processes including destructive and non-destructive methods, examples of which include sawing/cutting or x-raying of the weld joint respectively. In prior art methods such as these, trained or experienced weld personnel can determine the quality of a weld performed on a weld joint. Of course, destructive testing renders the weldment unusable and thus can only be used for a sampling or a subset of welded parts. While non-destructive testing, like x-raying, do not destroy the welded article, these methods can be cumbersome to use and the equipment expensive to purchase. Moreover, some weld joints cannot be appropriately x-rayed, i.e. completely or thoroughly x-rayed. By way of contrast, system 100 captures performance data during the welding process that can be used to determine the quality of the welded joint. More specifically, system 100 is used to identify potential discontinuities and flaws within specific regions of a weld joint. The captured data may be analyzed by an experienced welder or trained professional (e.g., a trainer 123, see FIG. 4), or in an alternative by the system 100 using the analysis module 122 for identifying areas within the weld joint that may be flawed. In one example, torch position and orientation along with travel speed and other critical parameters are analyzed as a whole to predict which areas along the weld joint, if any, are deficient. It will be understood that quality is achieved during the welding process when the operator 10 keeps the weld torch 230 within acceptable operational ranges. Accordingly, the performance data may be analyzed against known good parameters for achieving weld quality for a particular weld joint configuration.

Figure 6:
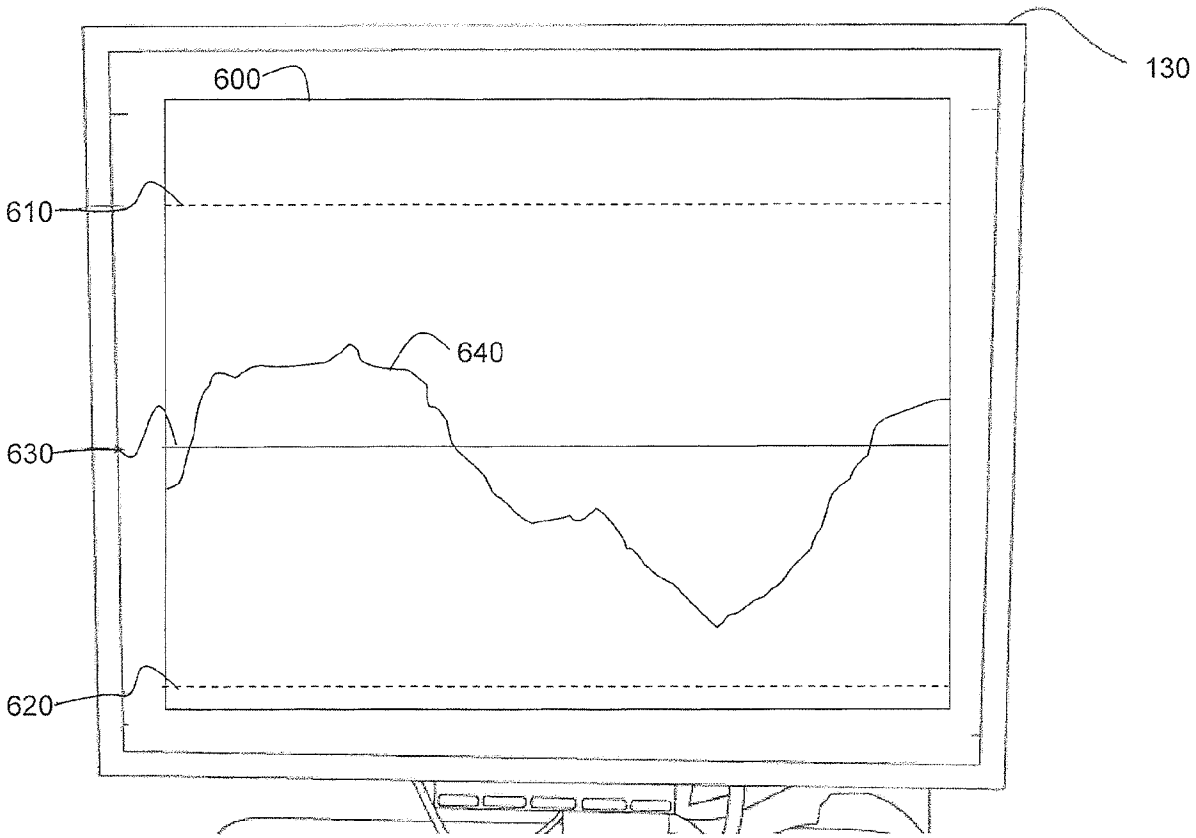
FIG. 6 illustrates an example embodiment of a graph, displayed on a display, showing tracked welding tool pitch angle versus time with respect to an upper pitch angle limit, a lower pitch angle limit, and an ideal pitch angle.

FIG. 6 illustrates an example embodiment of a graph 600, displayed on the display 130, showing tracked welding tool pitch angle 640 versus time with respect to an upper pitch angle limit 610, a lower pitch angle limit 620, and an ideal pitch angle 630. The upper and lower limits 610 and 620 define a range of acceptability between them. Different limits may be predefined for different types of users such as, for example, welding novices, welding experts, and persons at a trade show. The analysis engine 122 may provide a scoring capability, in accordance with an embodiment of the present invention, where a numeric score is provided based on how close to optimum (ideal) a user is for a particular tracked parameter, and depending on the determined level of discontinuities or defects determined to be present in the weld.

Performance data may be stored electronically in a database 140 (see FIG. 3) and managed by a database manager in a manner suitable for indexing and retrieving selected sets or subsets of data. In one embodiment, the data is retrieved and presented to an analyzing user (e.g., a trainer 123) for determining the weld quality of a particular weld joint. The data may be presented in tabular form for analysis by the analyzing user. Pictures, graphs, and or other symbol data may also be presented as is helpful to the analyzing user in determining weld quality. In an alternative embodiment, the performance data may be presented to the analyzing user in a virtual reality setting, whereby the real world welding process is simulated using real world data as captured by the system 100. An example of such a virtual reality setting is discussed in U.S. patent application Ser. No. 12/501,257 filed on Jul. 10, 2009. In this way, the weld joint and corresponding welding process may be reconstructed for review and analysis. Accordingly, the system 100 may be used to archive real data as it relates to a particular welded article. Still, it will be construed that any manner of representing captured data or reconstructing the welding process for the analyzing user may be used as is appropriate for determining weld quality.

In another embodiment, data captured and stored in the database 140 is analyzed by an analyzing module 122 (a.k.a., an analysis engine) of the system 100. The analyzing module 122 may comprise a computer program product executed by the processor based computing device 110. The computer program product may use artificial intelligence. In one particular embodiment, an expert system may be programmed with data derived from a knowledge expert and stored within an inference engine for independently analyzing and identifying flaws within the weld joint. By independently, it is meant that the analyzing module 122 functions independently from the analyzing user to determine weld quality. The expert system may be ruled-based and/or may incorporate fuzzy logic to analyze the weld joint. In this manner, areas along the weld joint may be identified as defective, or potentially defective, and marked for subsequent review by an analyzing user. Determining weld quality and/or problem areas within the weld joint may be accomplished by heuristic methods. As the system 100 analyzes welding processes of the various end users over repeated analyzing cycles, additional knowledge may be gained by the system 100 for determining weld quality.

A neural network or networks may be incorporated into the analysis engine 122 of the system 100 for analyzing data to determine weld quality, weld efficiency and/or weld flaws or problems. Neural networks may comprise software programming that simulates decision making capabilities. In one embodiment, the neural network(s) may process data captured by the system 100 making decisions based on weighted factors. It is noted that the neural network(s) may be trained to recognize problems that may arise from the weld torch position and movement, as well as other critical welding factors. Therefore, as data from the welding process is captured and stored, the system 100 may analyze the data for identifying the quality of the weld joint. Additionally, the system 100 may provide an output device 170 (see FIG. 4) that outputs indications of potential flaws in the weld such as, for example, porosity, weld overfill, and the like.

In capturing performance data, the system 100 incorporates a series of sensors, also referred to as sensor arrays 160, 165 (see FIG. 2). The sensor arrays 160, 165 include emitters and receivers positioned at various locations in proximity to the weldment 15, and more specifically, in proximity to the weld joint 16 for determining the position and orientation of the weld torch 230 in real time (or near real time). In one embodiment, the sensor arrays 160, 165 include acoustical sensor elements. It is noted that the acoustical sensor elements may use waves in the sub-sonic and/or ultra-sonic range. Alternate embodiments are contemplated that use optical sensor elements, infrared sensor elements, laser sensor elements, magnetic sensor elements, or electromagnetic (radio frequency) sensor elements. In this manner, the sensor emitter elements emit waves of energy in any of various forms that are picked up by the sensor receiver elements. To compensate for noise introduced by the welding process, the system 100 may also include bandwidth suppressors, which may be implemented in the form of software and/or electronic circuitry. The bandwidth suppressors are used to condition the sensor signals to penetrate interference caused by the welding arc. Additionally, the system 100 may further incorporate inertial sensors, which may include one or more accelerometers. In this manner, data relating to position, orientation, velocity, and acceleration may be required to ascertain the movements (i.e., motion) of the weld torch 230.

In one embodiment, part of the sensor arrays 160, 165 are received by the weld torch 230. That is to say that a portion of the sensors or sensor elements are affixed with respect to the body of the weld torch 230 (see sensor array [160] *165* of FIG. 2). In other embodiments, sensors and/or sensor elements may be affixed to a portion of the article being welded (see sensor array [165] *160* of FIG. 2). Still any manner of positioning and connecting the sensor elements may be chosen as is appropriate for tracking welding activity.

As an example of sensing and tracking a welding tool 230, in accordance with an embodiment of the present invention, a magnetic sensing capability may be provided. For example, the receiver sensor array 165 may be a magnetic sensor that is mounted on the welding tool 230, and the emitter sensor array 160 may take the form of a magnetic source. The magnetic source 160 may be mounted in a predefined fixed position and orientation with respect to the weldment 15. The magnetic source 160 creates a magnetic field around itself, including the space encompassing the welding tool 230 during use and establishes a 3D spatial frame of reference. The magnetic sensor 165 is provided which is capable of sensing the magnetic field produced by the magnetic source. The magnetic sensor 165 is attached to the welding tool 230 and is operatively connected to the processor based computing device 110 via, for example, a cable, or wirelessly. The magnetic sensor 165 includes an array of three induction coils orthogonally aligned along three spatial directions. The induction coils of the magnetic sensor 165 each measure the strength of the magnetic field in each of the three directions and provide that information to the real time tracking module 121 of the processor based computing device 110. As a result, the system 100 is able to know where the welding tool 230 is in space with respect to the 3D spatial frame of reference established by the magnetic field produced by the magnetic source 160. In accordance with other embodiments of the present invention, two or more magnetic sensors may be mounted on or within the welding tool 230 to provide a more accurate representation of the position and orientation of the welding tool 230, for example. Care is to be taken in establishing the magnetic 3D spatial frame of reference such that the weldment 15, the tool 230, and any other portions of the welding environment do not substantially distort the magnetic field created by the magnetic source 160. As an alternative, such distortions may be corrected for or calibrated out as part of a welding environment set up procedure. Other non-magnetic technologies (e.g., acoustic, optical, electromagnetic, inertial, etc.) may be used, as previously discussed herein, to avoid such distortions, as are well known in the art.

With reference to all of the figures, operation of the system 100 will now be described in accordance with an embodiment of the present invention. The end user 10 activates the system 100 and enters his or her user name via the user interface 135. Once authorized access has been gained, the end user 10 traverses the menu system as prompted by the computer program product 120 via the GUI 135. The system 100 instructs the end user 10 to initiate set up of the welding article 15, which includes entering information about the weldment materials and/or welding process being used. Entering such information may include, for example, selecting a language, entering a user name, selecting a weld coupon type, selecting a welding process and associated axial spray, pulse, or short arc methods, selecting a gas type and flow rate, selecting a type of stick electrode, and selecting a type of flux cored wire.

In one embodiment, the end user enters the starting and ending points of the weld joint 16. This allows the system 100, via the real time tracking module 121, to determine when to start and stop recording the tracked information. Intermediate points are subsequently entered for interpolating the weld joint trajectory as calculated by the system 100. Additionally, sensor emitters and/or receivers 160, 165 are placed proximate to the weld joint at locations suitable for gathering data in a manner consistent with that described herein. After set up is completed, system tracking is initiated and the end user 10 is prompted to begin the welding procedure. As the end user 10 completes the weld, the system 100 gathers performance data including the speed, position and orientation of the weld torch 230 for analysis by the system 100 in determining welder performance characteristics and weld quality characteristics as previously described herein.

In summary, a system and a method for tracking and analyzing welding activity is disclosed. Dynamic spatial properties of a welding tool are sensed during a welding process producing a weld. The sensed dynamic spatial properties are tracked over time and the tracked dynamic spatial properties are captured as tracked data during the welding process. The tracked data is analyzed to determine performance characteristics of a welder performing the welding process and quality characteristics of a weld produced by the welding process. The performance characteristics and the quality characteristics may be subsequently reviewed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A system for tracking and analyzing welding activity, said system comprising:

means for automatically sensing [dynamic] spatial properties of a welding tool during a welding process producing a *real world* weld;

means for automatically tracking said sensed [dynamic] spatial properties [over time] during said welding process;

means for automatically capturing *in real time or near real time* said tracked dynamic spatial properties as tracked data during said welding process; and means for automatically analyzing *in real time or near real time* said tracked data to determine [at least one of performance characteristics of a welder performing said welding process and] *a* quality [characteristics] *characteristic* of [a] *said real world* weld produced by said welding process.

2. The system of claim 1, *wherein said analyzing further comprises determining a performance characteristic of a welder performing said welding process, and*

*said system* further [comprising] *comprises* means for reviewing said performance [characteristics] *characteristic* of [a] *said* welder performing said welding process.

3. The system of claim 1 further comprising means for reviewing said quality [characteristics] *characteristic* of [a] *said real world* weld produced by said welding process.

4. The system of claim 1 further comprising means for a user to locally interact with said system.

5. The system of claim 1 further comprising means for a user to remotely interact with said system.

6. The system of claim 1 further comprising means for automatically authorizing access to a user of said system.

7. The system of claim 1, *wherein said analyzing comprises determining a performance characteristic of a welder performing said welding process, and* wherein said performance [characteristics of a welder include] *characteristic includes* at least one of a weld joint trajectory, a travel speed of said welding tool, welding tool pitch and roll angles, an electrode distance to a center weld joint, an electrode trajectory, and a weld time.

8. The system of claim 1 wherein said quality [characteristics of a weld produced by said welding process include] *characteristic includes* at least one of discontinuities and flaws within regions of [a] *said real world* weld produced by said welding process.

9. A system for tracking and analyzing welding activity, said system comprising:

at least one sensor array configured to sense [dynamic] spatial properties of a welding tool during a welding process producing a *real world* weld;

a processor based computing device operatively interfacing to said at least one sensor array and configured to track and analyze *in real time or near real time* said [dynamic] spatial properties of [a] *said* welding tool [over time] during [a] *said* welding process producing [a] *said real world* weld; and at least one user interface operatively interfacing to said processor based computing device, *said at least one user interface displaying a quality characteristic of said real world weld produced by said welding process.*

10. The system of claim 9 wherein said at least one user interface includes a graphical user interface.

11. The system of claim 9 wherein said at least one user interface includes a display device.

12. The system of claim 9 further comprising a network interface configured to interface said processor based computing device to an external communication network.

13. The system of claim 9 wherein said at least one sensor array includes at least one of acoustical sensor elements, optical sensor elements, magnetic sensor elements, *inertial sensor elements,* and electromagnetic sensor elements.

14. A method for tracking and analyzing welding activity, said method comprising:

sensing [dynamic] spatial properties of a welding tool during a welding process producing a *real world* weld [using at least one sensor];

tracking said sensed [dynamic] spatial properties [over time] *in real time or near real time* during said welding process [using a real time tracking module];

capturing said tracked [dynamic] spatial properties as tracked data *in real time or near real time* during said welding process [using a computer based memory device]; and analyzing said tracked data *in real time or near real time* to determine [at least one of performance characteristics of a welder performing said welding process and] *a* quality [characteristics] *characteristic* of [a] *said real world* weld produced by said welding process [using a computer based analysis engine].

15. The method of claim 14, *wherein said analyzing further comprises determining a performance characteristic of a welder performing said welding process, and*

*wherein said method* further [comprising] *comprises* outputting said performance [characteristics] *characteristic* of [a] *said* welder performing said welding process to at least one of a display device, a visualization module, and a testing module for review.

16. The method of claim 14 further comprising outputting said quality [characteristics] *characteristic* of [a] *said real world* weld produced by said welding process to at least one of a display device, a visualization module, and a testing module for review.

17. The method of claim 14 further comprising selecting welding set up parameters for said welding process via a user interface.

18. The method of claim [14] *15* further comprising remotely reviewing at least one of said performance [characteristics] *characteristic* of [a] *said* welder performing said welding process and said quality [characteristics] *characteristic* of [a] *said real world* weld produced by said welding process, via a communication network.

19. The method of claim 14, *wherein said analyzing further comprises determining a performance characteristic of a welder performing said welding process, and* wherein said performance [characteristics of a welder include] *characteristic includes* at least one of a weld joint trajectory, a travel speed of said welding tool, welding tool pitch and roll angles, an electrode distance to a center weld joint, an electrode trajectory, and a weld time.

20. The method of claim 14 wherein said quality [characteristics of a weld produced by said welding process include] *characteristic includes* at least one of discontinuities and flaws within regions of [a] *said real world* weld produced by said welding process.

*21. The system of claim 9, wherein said analysis of said spatial properties comprise determining at least one of a performance characteristic of a welder performing said welding process and a quality characteristic of said real world weld.*

*22. The system of claim 21, wherein said performance characteristic includes at least one of a weld joint trajectory, a travel speed of said welding tool, welding tool pitch and roll angles, an electrode distance to a center weld joint, an electrode trajectory, and a weld time.*

*23. The system of claim 21, wherein said quality characteristic includes at least one of a discontinuity and a flaw within a region of said weld produced by said welding process.*

*24. The system of claim 23, wherein said quality characteristic includes said flaw and said flaw comprises at least one of porosity and weld overfill.*

*25. The system of claim 24, wherein said spatial properties comprise at least one of a position, an orientation, and a movement of said welding tool.*

*26. The system of claim 9, wherein said welding tool comprises a portion of said at least one sensor array.*

*27. The system of claim 26, wherein said portion of said at least one sensor array includes at least one of acoustical sensor elements, magnetic sensor elements, inertial sensor elements, and electromagnetic sensor elements.*

*28. The system of claim 12, wherein said network interface is configured to transmit data representing said welding process to a remote system.*

*29. The system of claim 28, wherein said transmitted data comprises information related to a welder's performance.*

*30. The system of claim 9, wherein said processor based computing device is further configured to record in real time or near real time performance data corresponding to said welding process, and*

*wherein said performance data comprises at least one of a weld joint configuration or a weld joint trajectory, a weld speed, welding tool pitch and roll angles, an electrode distance to a center weld joint, a wire feed speed, an electrode trajectory, a weld time, and time and date data.*

*31. The system of claim 30, wherein said processor based computing device is further configured to record at least one of weldment materials, electrode materials, user name, and project ID number.*

*32. The system of claim 31, wherein said analyzing further comprises comparing said performance data to known parameters to determine said quality characteristic of said real world weld.*

*33. The system of claim 9, wherein said analyzing comprises determining a score based on a comparison of at least one of said tracked spatial properties to an optimum value corresponding to said at least one of said tracked spatial properties.*

*34. The system of claim 33, wherein said optimum value is a range comprising an upper limit and a lower limit for said at least one of said tracked spatial properties.*

*35. The system of claim 34, wherein said tracked spatial properties comprise at least one of a weld joint trajectory, a weld speed, welding tool pitch angle, welding tool roll angle, an electrode distance to a center weld joint, a wire feed speed, and an electrode trajectory.*

*36. The system of claim 35, wherein said tracked spatial properties includes said welding tool pitch angle.*

*37. The system of claim 9, wherein said welding process is performed manually.*

*38. The system of claim 9, wherein said welding process is performed by a robotic welder.*

*39. The system of claim 11, wherein said display device is integrated into a welding helmet.*

*40. The system of claim 9, wherein said processor based computing device is configured to set up a virtual reality setting in which said welding process can be simulated using said spatial properties of said welding tool.*

*41. The system of claim 9, wherein said welding tool is one of an electrode holder and a welding torch.*

*42. The system of claim 9, wherein said analysis is performed by an expert system configured identify defective or potentially defective areas along a weld joint.*

*43. The system of claim 42, wherein said expert system comprises at least one of a rule-based system and a neural network.*

*44. The system of claim 43, wherein said expert system is said neural network and said analysis is based on weighted factors.*

*45. The system of claim 9, wherein said processor based computing device is further configured to capture information corresponding to said welding process in an analysis record for subsequent review.*

*46. The method of claim 14, wherein said sensing comprises measuring at least one of an acoustical signal, a magnetic signal, an optical signal, inertial signal, and an electromagnetic signal.*

*47. The method of claim 14, further comprising transmitting to a remote system data representing said welding process.*

*48. The method of claim 47, further comprising analyzing said welding process based on said transmitted data.*

*49. The method of claim 14, further comprising recording in real time or near real time performance data corresponding to said welding process,*

*wherein said performance data comprises at least one of a weld joint configuration or a weld joint trajectory, a weld speed, welding tool pitch and roll angles, an electrode distance to a center weld joint, a wire feed speed, an electrode trajectory, a weld time, and time and date data.*

*50. The method of claim 49, wherein said recording further comprises recording data corresponding to at least one of weldment materials, electrode materials, user name, and project ID number.*

*51. The method of claim 49, wherein said analyzing comprises comparing said performance data to known parameters to determine said quality characteristic of said real world weld.*

*52. The method of claim 14, wherein said analyzing comprises determining a score based on a comparison of at least one of said tracked spatial properties to an optimum value.*

*53. The method of claim 52, wherein said optimum value is a range comprising an upper limit and a lower limit for said at least one of said tracked spatial properties.*

*54. The method of claim 53, wherein said tracked spatial properties comprise at least one of a weld joint trajectory, a weld speed, welding tool pitch angle, welding tool roll angle, an electrode distance to a center weld joint, a wire feed speed, and an electrode trajectory.*

*55. The system of claim 54, wherein said tracked spatial properties includes said welding tool pitch angle.*

*56. The method of claim 14, wherein said welding process is performed manually.*

*57. The method of claim 14, wherein said welding process is performed by a robotic welder.*

*58. The method of claim 14, further comprising storing information on said welding process an analysis record.*

*59. The method of claim 15, wherein said display device is integrated into a welding helmet.*

*60. The method of claim 16, wherein said display device is integrated into a welding helmet.*

*61. The method of claim 14, further comprising setting up a virtual reality setting in which said welding process can be simulated using said spatial properties of said welding tool.*

*62. The method of claim 14, wherein said welding tool is one of an electrode holder and a welding torch.*

*63. The method of claim 14, further comprising using an expert system to identify defective or potentially defective areas along said weld.*

*64. The method of claim 63, wherein said expert system uses at least one of a rule-based system and a neural network.*

*65. The method of claim 64, wherein said expert system uses said neural network and said identification is based on weighted factors.*

*66. The method of claim 14, further comprising capturing information corresponding to said welding process in an analysis record for subsequent review.*

*67. The method of claim 20, wherein said flaws comprise at least one of porosity and weld overfill.*

*68. The method of claim 67, wherein said spatial properties comprise at least one of a position, an orientation, and a movement of said welding tool.*

*69. A system for tracking and analyzing welding activity, said system comprising:*

*at least one sensor array configured to sense spatial properties of a welding tool during a welding process producing a real world weld; and*

*a processor based computing device operatively interfacing to said at least one sensor array and configured to track said spatial properties and record performance data corresponding to said welding process, said processor based computing device further configured to determine a quality characteristic of said real world weld.*

*70. The system of claim 69, wherein said analysis comprises comparing said performance data to known parameters to determine said quality characteristic of said weld.*

*71. The system of claim 70, wherein said quality characteristic includes at least one of a discontinuity and a flaw within a region of said weld.*

*72. The system of claim 71, wherein said recording is performed in real time or near real time.*

*73. The system of claim 72, wherein said spatial properties comprise at least one of a position, an orientation, and a movement of said welding tool, and*

*wherein said performance data comprises at least one of a weld joint configuration or a weld joint trajectory, a weld speed, welding tool pitch and roll angles, an electrode distance to a center weld joint, a wire feed speed, an electrode trajectory, a weld time, and time and date data.*

*74. The system of claim 73, wherein said processor based computing device is further configured to record at least one of weldment materials, electrode materials, user name, and project ID number.*

*75. The system of claim 73, wherein said analyzing further comprises determining a score based on at least a comparison of at least one of said tracked spatial properties to an optimum value said at least one of said tracked spatial properties.*

*76. The system of claim 75, wherein said optimum value is a range comprising an upper limit and a lower limit for said at least one of said tracked spatial properties.*

*77. The system of claim 76, wherein said tracked spatial properties comprise at least one of a weld joint trajectory, a weld speed, welding tool pitch angle, welding tool roll angle, an electrode distance to a center weld joint, a wire feed speed, and an electrode trajectory.*

*78. The system of claim 77, wherein said tracked spatial properties includes said welding tool pitch angle.*

*79. The system of claim 71, wherein said quality characteristic includes said flaw and said flaw comprises at least one of porosity and weld overfill.*

*80. The system of claim 69, wherein said welding process is performed manually.*

*81. The system of claim 69, wherein said welding process is performed by a robotic welder.*

*82. The system of claim 69, further comprising a display device to display said quality characteristic.*

*83. The system of claim 82, wherein said display device is integrated into a welding helmet.*

*84. The system of claim 69, wherein said processor based computing device is configured to set up a virtual reality setting in which said welding process can be simulated using said spatial properties of said welding tool.*

*85. The system of claim 69, wherein said welding tool is one of an electrode holder and a welding torch.*

*86. The system of claim 69, wherein said analysis is performed by an expert system configured identify defective or potentially defective areas along said weld.*

*87. The system of claim 86, wherein said expert system is a neural network and said analysis is based on weighted factors.*

*88. The system of claim 69, wherein said processor based computing device is further configured to capture information corresponding to said welding process in an analysis record for subsequent review.*

*89. A system for tracking and analyzing welding activity, said system comprising:*

*a tracking module configured to track spatial positions of a welding tool during a welding process; and*

*a processor subsystem configured to ascertain at least one welding parameter during the welding process based on said tracked spatial positions and to determine a score based on a comparison of said at least one welding parameter to an optimum value.*

*90. The system of claim 89, wherein said at least one welding parameter includes a performance characteristic of a welder.*

*91. The system of claim 89, wherein said at least one welding parameter includes a quality characteristic of a weld.*

*92. The system of claim 89, wherein said at least one welding parameter includes a performance characteristic of a welder and a quality characteristic of a weld.*

*93. The system of claim 89, wherein said processor subsystem includes an expert system.*

*94. The system of claim 93, wherein said expert system comprises at least one of a rule-based system and a neural network.*

*95. The system of claim 89, wherein said optimum value is a range comprising an upper limit and a lower limit for said at least one welding parameter.*

*96. The system of claim 95, wherein said at least one welding parameter comprises at least one of a weld joint trajectory, a weld speed, welding tool pitch angle, welding tool roll angle, an electrode distance to a center weld joint, a wire feed speed, and an electrode trajectory.*

*97. The system of claim 96, wherein said tracked spatial properties includes said welding tool pitch angle.*

*98. The system of claim 97, wherein said welding process is performed manually.*

*99. The system of claim 89, wherein said welding process is performed by a robotic welder.*

*100. The system of claim 91, further comprising a display device to display said quality characteristic.*

*101. The system of claim 100, wherein said display is integrated into a welding helmet.*

*102. The system of claim 89, wherein said processor based computing device is configured to set up a virtual reality setting in which said welding process can be simulated using said spatial properties of said welding tool.*

*103. The system of claim 89, wherein said welding tool is one of an electrode holder and a welding torch.*

*104. A method for tracking and analyzing welding activity, said method comprising:*

*sensing spatial properties of a welding tool during a welding process producing a real world weld;*

*tracking said sensed spatial properties;*

*recording performance data corresponding to said welding process; and*

*analyzing said performance data in real-time or near real-time to determine a quality characteristic of said real world weld produced by said welding process.*

*105. The method of claim 104, wherein said analyzing comprises comparing said performance data to a known parameter to determine said quality characteristic of said real world weld.*

*106. The method of claim 105, wherein said welding process is performed by a robotic welder.*

*107. The method of claim 105, wherein said quality characteristic includes at least one of a discontinuity and a flaw within a region of said real world weld.*

*108. The method of claim 107, wherein said quality characteristic includes said flaw and said flaw comprises at least one of porosity and weld overfill.*

*109. The method of claim 107, wherein said recording is performed in real time or near real time.*

*110. The method of claim 109, wherein said spatial properties comprise at least one of a position, an orientation, and a movement of said welding tool, and*

*wherein said performance data comprises at least one of a weld joint configuration or a weld joint trajectory, a weld speed, welding tool pitch and roll angles, an electrode distance to a center weld joint, a wire feed speed, an electrode trajectory, a weld time, and time and date data.*

*111. The method of claim 110, wherein further comprising recording at least one of weldment materials, electrode materials, user name, and project ID number.*

*112. The method of claim 104, wherein said analyzing further comprises determining a score based on at least a comparison of at least one of said tracked spatial properties to an optimum value.*

*113. The method of claim 112, wherein said optimum value is a range comprising an upper limit and a lower limit for said at least one of said tracked spatial properties.*

*114. The method of claim 113, wherein said tracked spatial properties comprise at least one of a weld joint trajectory, a weld speed, welding tool pitch angle, welding tool roll angle, an electrode distance to a center weld joint, a wire feed speed, and an electrode trajectory.*

*115. The system of claim 114, wherein said tracked spatial properties includes said welding tool pitch angle.*

*116. The method of claim 104, wherein said welding process is performed manually.*

*117. The method of claim 104, further comprising outputting said quality characteristic to a display device.*

*118. The method of claim 117, wherein said display device is integrated into a welding helmet.*

*119. The method of claim 104, further comprising setting up a virtual reality setting in which said welding process can be simulated using said spatial properties of said welding tool.*

*120. The method of claim 104, wherein said welding tool is one of an electrode holder and a welding torch.*

*121. The method of claim 104, further comprising using an expert system to identify defective or potentially defective areas along said weld.*

*122. The method of claim 121, wherein said expert system is a neural network and said identification is based on weighted factors.*

*123. The method of claim 104, further comprising capturing information corresponding to said welding process in an analysis record for subsequent review.*

*124. A method for tracking and analyzing welding activity, said system comprising:*

*tracking spatial positions of a welding tool during a welding process;*

*determining at least one welding parameter during the welding process based on said tracked spatial positions;*

*determining a score based on a comparison of said at least one welding parameter to an optimum value.*

*125. The method of claim 124, wherein said determining of said at least one welding parameter comprises analyzing a performance characteristic of a welder.*

*126. The method of claim 124, wherein said determining of said at least one welding parameter comprises analyzing a quality characteristic of a weld.*

*127. The method of claim 124, wherein said determining of said at least one welding parameter comprises analyzing a performance characteristic of a welder and a quality characteristic of a weld.*

*128. The method of claim 124, wherein said determining of said at least one welding parameter comprises using an expert system.*

*129. The method of claim 128, wherein said expert system uses at least one of a rule-based system and a neural network.*

*130. The method of claim 124, wherein said optimum value is a range comprising an upper limit and a lower limit for said at least one welding parameter.*

*131. The method of claim 130, wherein said at least one welding parameter comprises at least one of a weld joint trajectory, a weld speed, welding tool pitch angle, welding tool roll angle, an electrode distance to a center weld joint, a wire feed speed, and an electrode trajectory.*

*132. The method of claim 131, wherein said at least one welding parameter includes said welding tool pitch angle.*

*133. The method of claim 124, wherein said welding process is performed manually.*

*134. The method of claim 124, wherein said welding process is performed by a robotic welder.*

*135. The method of claim 124, further comprising setting up a virtual reality setting in which said welding process can be simulated using said spatial properties of said welding tool.*

*136. The system of claim 124, wherein said welding tool is one of an electrode holder and a welding torch.*

*137. A system for tracking welding activity, said system comprising:*

*an optical tracking system that tracks at least one of a position, a movement, and an orientation of a welding tool; and*

*a computer operatively interfacing to said optical tracking system, said computer determining at least one parameter that is at least one of a travel speed, a pitch angle, a roll angle, and an electrode distance to a center weld joint of said welding tool,*

*wherein said processor based computing device determines for each of said at least one parameter a score based on a comparison of said parameter to at least one predetermined limit for said parameter.*

*138. The system of claim 137, wherein said score relates to a weld quality of a real world weld.*

*139. The system of claim 138, wherein said score relates to said weld quality of said real world weld, and*

*wherein said weld quality includes an indication of at least one of a discontinuity and a flaw within a region of said real world weld.*

*140. The system of claim 139, wherein said weld quality includes an indication of said flaw and said flaw comprises at least one of porosity and weld overfill.*

*141. The system of claim 139, wherein said determination of said score is performed in real time or near real time.*

*142. The system of claim 138, wherein an expert system identifies defective or potentially defective areas along said real world weld.*

*143. The system of claim 137, wherein said at least one parameter further includes at least one of a weld joint configuration or a weld joint trajectory, a weld speed, a wire feed speed, an electrode trajectory, a weld time, and time and date data.*

*144. The system of claim 137, wherein said processor based computing device is further configured to record at least one of weldment materials, electrode materials, user name, and project ID number.*

*145. The system of claim 137, wherein said at least one predetermined limit includes an upper limit and a lower limit.*

*146. The system of claim 137, further comprising a display device to display said score.*

*147. The system of claim 146, wherein said display device is integrated into a welding helmet.*

*148. The system of claim 137, wherein said welding tool is one of an electrode holder and a welding torch.*

*149. A system for tracking welding activity, said system comprising:*

*an infrared tracking system that tracks at least one of a position, a movement, and an orientation of a welding tool based on an infrared element attached to said welding tool; and*

*a computer operatively interfacing to said infrared tracking system, said computer determining at least one parameter that is at least one of a travel speed, a pitch angle, a roll angle, and an electrode distance to a center weld joint of said welding tool,*

*wherein said computer determines for each of said at least one parameter a score based on a comparison of said parameter to at least one predetermined limit for said parameter.*

*150. The system of claim 149, wherein said score relates to a weld quality of a real world weld.*

*151. The system of claim 150, wherein an expert system identifies defective or potentially defective areas along said real world weld.*

*152. The system of claim 150, wherein said score relates to said weld quality of said real world weld, and*

*wherein said weld quality includes an indication of at least one of a discontinuity and a flaw within a region of said real world weld.*

*153. The system of claim 152, wherein said weld quality includes an indication of said flaw and said flaw comprises at least one of porosity and weld overfill.*

*154. The system of claim 152, wherein said determination of said score is performed in real time or near real time.*

*155. The system of claim 149, wherein said at least one parameter further includes at least one of a weld joint configuration or a weld joint trajectory, a weld speed, a wire feed speed, an electrode trajectory, a weld time, and time and date data.*

*156. The system of claim 149, wherein said processor based computing device is further configured to record at least one of weldment materials, electrode materials, user name, and project ID number.*

*157. The system of claim 149, wherein said at least one predetermined limit includes an upper limit and a lower limit.*

*158. The system of claim 149, further comprising a display device to display said score.*

*159. The system of claim 158, wherein said display device is integrated into a welding helmet.*

*160. The system of claim 149, wherein said welding tool is one of an electrode holder and a welding torch.*

*161. A method for tracking welding activity, said method comprising:*

*optically tracking at least one of a position, a movement, and an orientation of a welding tool;*

*determining at least one parameter that is at least one of a travel speed, a pitch angle, a roll angle, and an electrode distance to a center weld joint of said welding tool; and*

*computing for each of said at least one parameter a score based on a comparison of said parameter to at least one predetermined limit for said parameter.*

*162. The method of claim 161, wherein said score relates to a weld quality of a real world weld.*

*163. The method of claim 162, wherein an expert system identifies defective or potentially defective areas along said real world weld.*

*164. The method of claim 162, wherein said score relates to said weld quality of said real world weld, and*

*wherein said weld quality includes an indication of at least one of a discontinuity and a flaw within a region of said real world weld.*

*165. The method of claim 164, wherein said weld quality includes an indication of said flaw and said flaw comprises at least one of porosity and weld overfill.*

*166. The method of claim 164, wherein said determination of said score is performed in real time or near real time.*

*167. The method of claim 161, wherein said at least one parameter further includes at least one of a weld joint configuration or a weld joint trajectory, a weld speed, a wire feed speed, an electrode trajectory, a weld time, and time and date data.*

*168. The method of claim 167, wherein said processor based computing device is further configured to record at least one of weldment materials, electrode materials, user name, and project ID number.*

*169. The method of claim 161, wherein said at least one predetermined limit includes an upper limit and a lower limit.*

*170. The method of claim 161, further comprising a display device to display said score.*

*171. The method of claim 170, wherein said display device is integrated into a welding helmet.*

*172. The method of claim 161, wherein said welding tool is one of an electrode holder and a welding torch.*

*173. A method for tracking welding activity, said method comprising:*

*tracking by infrared at least one of a position, a movement, and an orientation of a welding tool based on an infrared element attached to said welding tool;*

*determining at least one parameter that is at least one of a travel speed, a pitch angle, a roll angle, and an electrode distance to a center weld joint of said welding tool; and*

*computing for each of said at least one parameter a score based on a comparison of said parameter to at least one predetermined limit for said parameter.*

*174. The method of claim 173, wherein said score relates to a weld quality of a real world weld.*

*175. The method of claim 174, wherein said score relates to said weld quality of said real world weld, and*

*wherein said weld quality includes an indication of at least one of a discontinuity and a flaw within a region of said real world weld.*

*176. The method of claim 175, wherein said weld quality includes an indication of said flaw and said flaw comprises at least one of porosity and weld overfill.*

*177. The method of claim 175, wherein said determination of said score is performed in real time or near real time.*

*178. The method of claim 174, wherein an expert system identifies defective or potentially defective areas along said real world weld.*

*179. The method of claim 173, wherein said at least one parameter further includes at least one of a weld joint configuration or a weld joint trajectory, a weld speed, a wire feed speed, an electrode trajectory, a weld time, and time and date data.*

*180. The method of claim 179, wherein said processor based computing device is further configured to record at least one of weldment materials, electrode materials, user name, and project ID number.*

*181. The method of claim 173, wherein said at least one predetermined limit includes an upper limit and a lower limit.*

*182. The method of claim 173, further comprising a display device to display said score.*

*183. The method of claim 182, wherein said display device is integrated into a welding helmet.*

*184. The method of claim 173, wherein said welding tool is one of an electrode holder and a welding torch.*

*185. A system for tracking and analyzing welding activity, said system comprising:*

*at least one sensor array configured to sense spatial properties of a welding tool during a welding process producing a real world weld;*

*a processor based computing device operatively interfacing to said at least one sensor array and configured to track and analyze in real time or near real time said spatial properties of said welding tool during said welding process producing said real world weld; and*

*at least one display interfacing to said processor based computing device, said at least one display displaying a quality characteristic of said real world weld produced by said welding process.*

*186. A system for tracking welding activity, said system comprising:*

*an infrared tracking system that tracks at least one of a position, a movement, and an orientation of a welding tool based on an infrared emitter attached to said welding tool; and*

*a computer operatively interfacing to said infrared tracking system, said computer determining at least one parameter that is at least one of a travel speed, a pitch angle, a roll angle, and an electrode distance to a center weld joint of said welding tool,*

*wherein said computer determines for each of said at least one parameter a score based on a comparison of said parameter to at least one predetermined limit for said parameter.*

*187. A method for tracking welding activity, said method comprising:*

*tracking by infrared at least one of a position, a movement, and an orientation of a welding tool based on an infrared emission from said welding tool;*

*determining at least one parameter that is at least one of a travel speed, a pitch angle, a roll angle, and an electrode distance to a center weld joint of said welding tool,*

*computing for each of said at least one parameter a score based on a comparison of said parameter to at least one predetermined limit for said parameter.*

*188. A system for tracking welding activity, said system comprising:*

*an optical tracking system that tracks in real time or near real time at least one of a position, a movement, and an orientation of a welding tool; and*

*a computer operatively interfacing to said optical tracking system, said computer determining in real time or near*

*real time at least one parameter that is at least one of a travel speed, a pitch angle, a roll angle, and an electrode distance to a center weld joint of said welding tool,*

*wherein said processor based computing device determines for each of said at least one parameter a score based on a comparison of said parameter to at least one predetermined limit for said parameter, and*

*wherein said score relates to a weld quality of a real world weld.*

*189. The system of claim 188, wherein said determination of said score is performed in real time or near real time.*

*190. A system for tracking welding activity, said system comprising:*

*an infrared tracking system that tracks in real time or near real time at least one of a position, a movement, and an orientation of a welding tool based on an infrared element attached to said welding tool; and*

*a computer operatively interfacing to said infrared tracking system, said computer determining in real time or near real time at least one parameter that is at least one of a travel speed, a pitch angle, a roll angle, and an electrode distance to a center weld joint of said welding tool,*

*wherein said computer determines for each of said at least one parameter a score based on a comparison of said parameter to at least one predetermined limit for said parameter, and*

*wherein said score relates to a weld quality of a real world weld.*

*191. The system of claim 190, wherein said determination of said score is performed in real time or near real time.*

*192. A method for tracking welding activity, said method comprising:*

*optically tracking in real time or near real time at least one of a position, a movement, and an orientation of a welding tool;*

*determining in real time or near real time at least one parameter that is at least one of a travel speed, a pitch angle, a roll angle, and an electrode distance to a center weld joint of said welding tool; and*

*computing for each of said at least one parameter a score based on a comparison of said parameter to at least one predetermined limit for said parameter, and*

*wherein said score relates to a weld quality of a real world weld.*

*193. The method of claim 192, wherein said determination of said score is performed in real time or near real time.*

*194. A method for tracking welding activity, said method comprising:*

*tracking by infrared in real time or near real time at least one of a position, a movement, and an orientation of a welding tool based on an infrared element attached to said welding tool;*

*determining in real time or near real time at least one parameter that is at least one of a travel speed, a pitch angle, a roll angle, and an electrode distance to a center weld joint of said welding tool; and*

*computing for each of said at least one parameter a score based on a comparison of said parameter to at least one predetermined limit for said parameter, and*

*wherein said score relates to a weld quality of a real world weld.*

*195. The method of claim 194, wherein said determination of said score is performed in real time or near real time.*

* * * * *

UNITED STATES PATENT AND TRADEMARK OFFICE

CERTIFICATE OF CORRECTION

PATENT NO. : RE45,398 E
APPLICATION NO. : 14/177692
DATED : March 3, 2015
INVENTOR(S) : Matthew Wayne Wallace It is certified that error appears in the above-identified patent and that said Letters Patent is hereby corrected as shown below:

In the Claims,

In column 9, line 63, delete “dynamic” and insert --[dynamic]--, therefor.

In column 11, line 51, delete “a” and insert --said--, therefor.

In column 12, line 46, delete “includes” and insert --include--, therefor.

In column 12, line 60, after “configured” insert --to--.

In column 13, line 7, before “intertial” insert --an--.

In column 13, line 43, delete “system” and insert --method--, therefor.

In column 13, line 44, delete “includes” and insert --include--, therefor.

In column 13, line 50, after “process” insert --in--.

In column 14, line 45, after “value” insert --corresponding to--.

In column 14, line 56, delete “includes” and insert --include--, therefor.

In column 15, line 8, after “configured” insert --to--.

In column 15, line 49, delete “includes” and insert --include--, therefor.

In column 15, lines 58-59, delete “based computing device” and insert --subsystem--, therefor.

In column 16, line 45, delete “system” and insert --method--, therefor.

Signed and Sealed this
Twenty-first Day of July, 2015

Michelle K. Lee

Michelle K. Lee
*Director of the United States Patent and Trademark Office*

In column 16, line 46, delete “includes” and insert --include--, therefor.

In column 17, line 42, delete “system” and insert --method--, therefor.

In column 17, line 54, delete “processor based computing device” and insert --computer--, therefor.

In column 18, lines 11-12, delete “processor based computing device” and insert --computer--, therefor.

In column 18, lines 58-59, delete “processor based computing device” and insert --computer--, therefor.

In column 19, lines 33-34, delete “processor based computing device is further configured to record” and insert --computing further includes recording--, therefor.

In column 20, lines 9-10, delete “processor based computing device is further configured to record” and insert --computing further includes recording--, therefor.

In column 21, line 4, delete “processor based computing device” and insert --computer--, therefor.